US012237714B2

(12) United States Patent
Emert et al.

(10) Patent No.: US 12,237,714 B2
(45) Date of Patent: Feb. 25, 2025

(54) BESSUPS (BATTERY ENERGY STORAGE SYSTEM UNINTERRUPTIBLE POWER SYSTEM)

(71) Applicant: Rosendin Electric, Inc., San Jose, CA (US)

(72) Inventors: Steven Emert, Menlo Park, CA (US); William Paul Mazzetti, Jr., San Francisco, CA (US)

(73) Assignee: Rosendin Electric, Inc., San Jose, CA (US)

( * ) Notice: Subject to any disclaimer, the term of this patent is extended or adjusted under 35 U.S.C. 154(b) by 10 days.

(21) Appl. No.: 17/573,407

(22) Filed: Jan. 11, 2022

(65) Prior Publication Data

US 2022/0224144 A1 Jul. 14, 2022

Related U.S. Application Data

(60) Provisional application No. 63/136,600, filed on Jan. 12, 2021, provisional application No. 63/136,597, filed on Jan. 12, 2021.

(51) Int. Cl.
*H02J 9/06* (2006.01)
*H02J 7/00* (2006.01)

(52) U.S. Cl.
CPC ............ *H02J 9/061* (2013.01); *H02J 7/0013* (2013.01); *H02J 7/0063* (2013.01)

(58) Field of Classification Search
CPC ......... H02J 9/061; H02J 7/0013; H02J 7/0063
USPC .................................................. 307/64, 142
See application file for complete search history.

(56) References Cited

U.S. PATENT DOCUMENTS

| 7,157,803 | B2 * | 1/2007 | Meyers ..................... H02J 9/06 307/64 |
| 7,554,220 | B2 * | 6/2009 | Sugawara ........... H01M 10/425 307/64 |
| 8,193,662 | B1 * | 6/2012 | Carlson ..................... G06F 1/30 307/64 |

(Continued)

OTHER PUBLICATIONS

The International Searching Authority, The International Search Report and the Written Opinion of the Inernational Searching Authority, or the Declaration, 21 pages, Mar. 29, 2022.

(Continued)

*Primary Examiner* — Michael R. Fin
(74) *Attorney, Agent, or Firm* — Rutan and Tucker, LLP

(57) ABSTRACT

An integrated electrical power unit (IEPU) coupled to the magnetic coupling choke that acts as both a line reactor to supply the uninterruptible regulated and conditioned source of AC power as well as the emergency backup source of power. The IEPU includes a battery storage plant (BESS) and a power conversion and conditioning module (PCSM) to i) convert AC power to DC power going into the BESS as well as convert DC power into AC power supplied out of the module, as well as ii) perform conditioning of the AC power supplied out of the PCSM to be an uninterruptible supply of regulated and conditioned AC power to stay within a set voltage level and frequency range. The IEPU couples to a magnetic coupling choke to form a line reactor to compensate for defects occurring in power coming from the main AC power source from reaching and affecting the electrical loads.

23 Claims, 12 Drawing Sheets

(56) References Cited

U.S. PATENT DOCUMENTS

| | | | |
|---|---|---|---|
| 2003/0048006 A1* | 3/2003 | Shelter, Jr. | H02J 9/061 |
| | | | 307/64 |
| 2014/0375133 A1* | 12/2014 | McCarthy | H02J 9/066 |
| | | | 307/68 |
| 2016/0233699 A1 | 8/2016 | Kang | |
| 2017/0163089 A1* | 6/2017 | Van Zeyl | H01M 10/425 |
| 2017/0170684 A1 | 6/2017 | Matthey | |
| 2018/0233931 A1 | 8/2018 | Beaston | |
| 2018/0264955 A1 | 9/2018 | Gupta | |
| 2018/0269782 A1* | 9/2018 | Mondal | H02J 9/00 |
| 2019/0157869 A1 | 5/2019 | Gadh et al. | |
| 2021/0249894 A1* | 8/2021 | Panfil | H02J 9/062 |
| 2023/0307942 A1* | 9/2023 | Matsumoto | H02J 3/32 |

OTHER PUBLICATIONS

European Patent Office, The extended European search report, 10 pages, Dec. 3, 2024.

Josep M Guerrero et al.: "Uninterruptible power supply systems provide protection", IEEE Industrial Electronics Magazine, IEEE, US, vol. 1, No. 1, Mar. 1, 2007 (Mar. 1, 2007), pp. 28-38, XP011184487, ISSN: 1932-4529 * p. 29-p. 37 *.

Dirk Uwe Sauer, et al.: "Energy Storage Technologies for Grids With High Penetration of Renewable Energies and for Grid Connected PV Systems," from The Compiled State-Of-The-Art of PV Solar Technology and Deployment : 23rd European Photovoltaic Solar Energy Conference, EU pvsec; proceedings of the international conference, held in Valencia, Spain, Sep. 1-5, 2008 (Sep. 1, 2008), XP040529494, ISBN: 978-3-936338-24-9 *p. 2678*.

* cited by examiner

BESSUPS (BATTERY ENERGY STORAGE SYSTEM UNINTERRUPTIBLE POWER SYSTEM)

RELATED APPLICATIONS

This application claims priority under 35 USC 119 to both U.S. provisional patent application Ser. 63/136,597, titled "BATTERY BACKUP POWER PACK," filed 12 Jan. 2021, as well as U.S. provisional patent application Ser. 63/136,600, titled "BESSUPS (BATTERY ENERGY STORAGE SYSTEM UNINTERRUPTIBLE POWER SYSTEM)," filed 12 Jan. 2021, which the disclosures of such are incorporated herein by reference in their entirety.

FIELD

Embodiments of the design relate to Electrical Power Distribution.

BACKGROUND

Flywheel UPSs can currently be used to provide fully conditioned and continuous power to critical equipment demands.

Diesel generators can be used to provide standby power/emergency back-up power.

SUMMARY

Methods systems, and apparatus are disclosed for a Battery Energy Storage System Uninterruptible Power System. In an embodiment, an integrated electrical power unit can include a battery storage plant and a power conversion and conditioning module. The power conversion and conditioning module includes i) electrical components that perform an electrical power conversion of AC power supplied from a main AC power source to DC power going into the battery storage plant as well as ii) electrical components that perform an electrical power conversion of DC power coming from the battery storage plant into AC power supplied out of the electrical power conversion and conditioning module, as well as iii) electrical components that perform an electrical power conditioning of the AC power supplied out of the electrical power conversion and conditioning module to be an uninterruptible supply of regulated and conditioned AC power to stay within a set voltage level and frequency range, which eliminates swings in voltage amplitude and/or frequency that are outside the set regulated and conditioned AC voltage level and frequency range even when the AC power supplied from a main AC power source into the electrical power unit does have swings in voltage level and/or frequency outside the set regulated and conditioned AC voltage level and frequency range.

The electrical power conversion and conditioning module can supply the uninterruptible supply of regulated and conditioned AC power to stay within a set voltage level and frequency range to electrical equipment loads downstream of the integrated electrical power unit.

The integrated electrical power unit can electrically couple to a magnetic coupling choke to form a line reactor to compensate for and eliminate at least one or more of i) surges, ii) transients, and iii) harmonics issues to the AC voltage level, frequency, and phase of the AC voltage occurring in the AC power coming from the main AC power source from reaching and affecting the electrical equipment loads.

The battery storage plant of the integrated electrical power unit can have a capacity in amp-hours (Ahrs) to provide a continuous emergency backup source of AC power to supply the electrical equipment loads connected downstream to the integrated electrical power unit for greater than an hour.

The integrated electrical power unit is electrically located between the main source of AC power and an input circuit breaker of a distribution switchboard of a facility containing the electrical equipment loads.

The integrated electrical power unit coupled to the magnetic coupling choke can act as both the line reactor to supply the uninterruptible regulated and conditioned source of AC power as well as the emergency backup source of power.

These and many more embodiments are discussed.

BRIEF DESCRIPTION OF DRAWINGS

The drawings refer to embodiments of the invention in which.

Figure 1A:
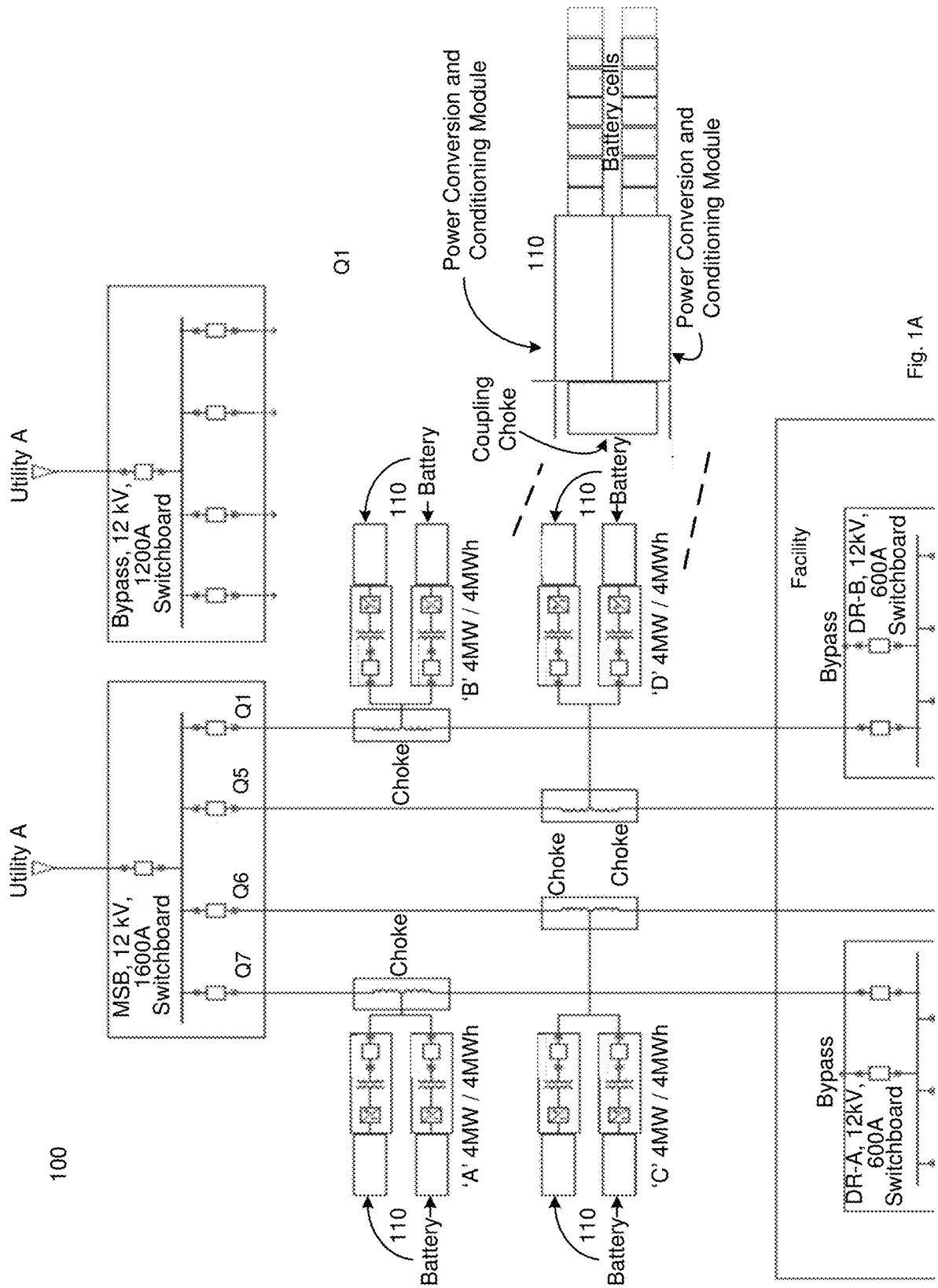
FIG. 1A is a single line diagram of an embodiment of a BESSUPS system that presents an example set of components making up a BESSUPS system with one or more integrated electrical power units.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, amount of emergency power supplies, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first enclosure, may be made. However, the specific numeric reference should not be interpreted as a literal sequential order but rather interpreted that the first enclosure is different than a second enclosure. Thus, the specific details set forth are merely exemplary. The specific details may be varied from and still be contemplated to be within the spirit and scope of the present invention.

Figure 1B:
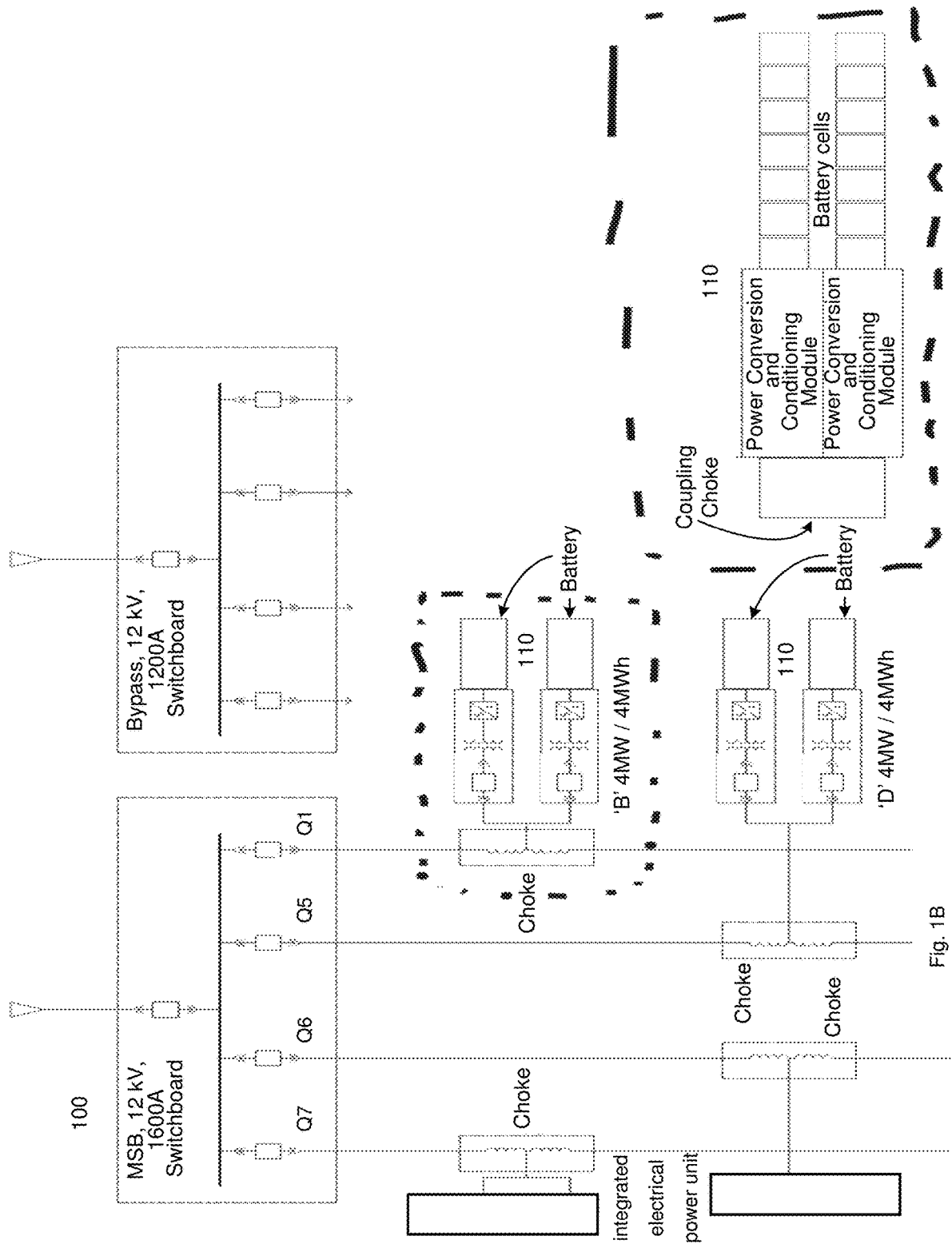
FIG. 1B is a magnified view of the single line diagram of an embodiment of a BESSUPS system that presents an example set of components making up the BESSUPS system with one or more integrated electrical power units.

FIG. 1A is a single line diagram of an embodiment of a BESSUPS system that presents an example set of components making up a BESSUPS system with one or more integrated electrical power units. FIG. 1B is a magnified view of the single line diagram of an embodiment of a BESSUPS system that presents an example set of components making up the BESSUPS system with one or more integrated electrical power units.

The integrated electrical power unit of the BESSUPS system 100 combines modified components from A) a Battery Energy (chemical energy) Storage System (BESS) and B) an Uninterruptible Power System (UPS) in order to have a single device/unitary piece of electrical gear configured to cooperate with C) a magnetic coupling choke to form a line reactor to provide both 1) an emergency back-up power source, such as a flywheel back-up power system, a fossil fueled generator, etc., 2) while providing fully conditioned and continuous/uninterruptible power like traditional static UPS systems, to critical electrical equipment loads in the facility. The BESSUPS system 100 stabilizes micro electrical power grids and supply an emergency back-up power for that micro electrical power grid, which eliminates a need for, for example, diesel generators for that micro electrical power grid as well as a UPS per switchboard.

The BESSUPS system 100 can consist of the set of one or more integrated electrical power units, its controller, and their associated circuit breakers, and a magnetic coupling choke corresponding each integrated electrical power unit.

The integrated electrical power unit of the BESSUPS system 100 has multi-modes of operation that allow the device to be in use in the electrical power supply system all the time to supply conditioned AC power to critical electrical loads in a downstream facility and then when required can also be an emergency back-up power source when electricity from the utility power grid or other source main electrical power source becomes unreliable or goes away.

The integrated electrical power unit can include a battery storage plant 110 and a power conversion and conditioning module. The power conversion and conditioning module can include i) electrical components (e.g., voltage inverters, voltage regulators, electrical filters, uninterruptable power supply, etc.) an electrical power conversion of AC power supplied from a main AC power source to DC power going into the battery storage plant 110 as well as ii) electrical components for electrical power conversion of DC power coming from the battery storage plant 110 into AC power supplied out of the electrical power conversion and conditioning module, as well as iii) electrical components for electrical power conditioning of the AC power supplied out of the electrical power conversion and conditioning module to be an uninterruptible supply of regulated and conditioned AC power to stay within a set voltage level and frequency range, which eliminates swings in voltage amplitude and/or frequency that are outside the set regulated and conditioned AC voltage level and frequency range even when the AC power supplied from a main AC power source (such as the utility power grid) into the electrical power unit does have swings in voltage level and/or frequency outside the set regulated and conditioned AC voltage level and frequency range. The electrical power conversion and conditioning module is configured to supply the uninterruptible supply of regulated and conditioned AC power to stay within a set voltage level and frequency range to electrical equipment loads downstream of the integrated electrical power unit. Each electrical power line-feed coming from a utility grid's power line can have an integrated electrical power unit electrically coupled to that electrical power line-feed.

The integrated electrical power unit is configured to electrically couple to a magnetic coupling choke to form a line reactor to compensate for and eliminate at least one or more of i) surges, ii) transients, and iii) harmonics issues to the AC voltage level, frequency, and phase of the AC voltage occurring in the AC power coming from the main AC power source from reaching and affecting the electrical equipment loads. The filters and regulators in the electrical power conversion and conditioning module can eliminate all three of i) surges, ii) transients, and iii) harmonics issues to the AC voltage level, frequency, and phase of the AC voltage occurring in the AC power coming from the main AC power source from reaching and affecting the electrical equipment loads. The integrated electrical power unit coupled to the magnetic coupling choke is configured to act as both the line reactor to supply the uninterruptible regulated and conditioned source of AC power (as discussed above) as well as the emergency backup source of power (when the main AC power source fails).

Each integrated electrical power unit (labeled 'A' 4 MW/4 MWh) (e.g., 4 MegaWatt-4 MegaWatt hours) may consist of one or more battery storage plants 110 (labeled Battery), each battery storage plant 110 including a scalable amount of batteries, and one or more power electrical power conversion and conditioning module (PSCM) to bilaterally convert voltage into and out of the integrated electrical power unit.

In the example in FIGS. 1A and 1B, two 2 MW integrated electrical power units connect in parallel to a magnetic coupling choke (labeled Choke). The electrical power conversion and conditioning module converts AC power into that electrical power conversion and conditioning module into DC power to the battery storage plant 110 as well as DC power from the battery storage plant 110 to AC voltage output from the electrical power conversion and conditioning module. The electrical power conversion and conditioning module converts electrical energy through rectifiers and inverters, electrical filters, and regulators.

The controller of the integrated electrical power unit and its associated circuit breakers (e.g., Q1 and Q5-Q7) cooperate to electrically isolate and connect the integrated electrical power unit to its corresponding electrical power line feed from the utility grid's power line. As shown in the FIGS. 1A and 1B there are, as an example, four electrical power line feeds coming from the utility grid's power lines each with an example 400 amp input breaker (Q1 and Q5-Q7) in the main switchboard tied to the controller of the corresponding the integrated electrical power unit (e.g., integrated electrical power unit labeled 'A' 4 MW/4 MWh). Each power line feed goes to a separate step down transformer in order to feed AC power at a voltage of, for example, 480 VAC to the switchgear (labeled "Switchgear") distributing the AC power to the electrical equipment loads within a facility (the rectangular outline) of that micro grid, such as a data center, hospital, manufacturing facility, etc. in order to provide redundant backup power; and in this example, a 4-for-3 redundant electrical power distribution scheme. The four separate switchgear units each receives its own AC power from its corresponding integrated electrical power unit (labeled A-D) and utility grid power line feed. Each switchgear unit distributes electrical power to critical and/or non-critical electrical equipment loads in the micro grid. Inside the facility, each switchgear unit also electrically connects to its redundant source of AC power that comes, via a power cable, from another switchgear unit in the redundant electrical power distribution scheme.

Next, the controller of the integrated electrical power unit can be programmed to a desired AC voltage level out. The battery storage plant 110 portion of the integrated electrical power unit can have a capacity of, for example, (1500 VDC at 2700 amps)=4 MW, and has a controller that allows a user to programmably supply at different AC voltage levels such as 1,000 VAC, 12,000 VAC and up to 35,000 VAC supplied out of the electrical power conversion and conditioning module. In another embodiment, the battery storage plant 110 portion of the integrated electrical power unit can have different voltage level of, for example, 750 VDC and the controller allows the user to programmably supply an AC voltage level output of 1,000 VAC or less typically 480 VAC. Note, the controller works with the rectifiers, filters, and voltage regulators in the electrical power conversion and conditioning module of the integrated electrical power unit to set the AC voltage level coming out of that electrical power conversion and conditioning module even though the same AC voltage level is coming from the utility grid's power line. Thus the controller and the electrical power conversion and conditioning module scale the output AC voltage level from the power conversion and conditioning module to the downstream switchgear cabinet and/or step down transformer.

Next, each battery storage plant 110 with its backup battery power packs can also be scalable in both its energy storage capacity by simply stacking more battery cells connected electrically in series-parallel in its battery storage plant 110.

The integrated electrical power unit with its battery storage plant 110 and its power conversion and conditioning module provides continuous conditioned AC electrical power; and therefore, eliminates any need electrically downstream inside the facility for a typical uninterruptible power supply to supply continuous conditioned power to sensitive critical electrical equipment loads, such as servers, routers, databases, etc. These critical electrical equipment loads are downstream of the circuit breakers in the switchboards of the facility and require continuous conditioned electrical power.

The integrated electrical power unit is electrically located between the main source of AC power (such as the electrical power lines of the utility grid) and an input circuit breaker of a distribution switchboard (downstream of a main switchboard) of a facility containing the electrical equipment loads.

The battery storage plant 110 of the integrated electrical power unit is configured to have a capacity in amp-hours (Ahrs) to provide a continuous emergency backup source of AC power to supply all of the electrical equipment loads connected downstream to the integrated electrical power unit for greater than an hour. An example electrical power capacity of the integrated electrical power unit can be, for example, 4 MegaWatt (MW) hours. However, the integrated electrical power unit is configurable by putting enough batteries in series-parallel in the battery storage plant 110 to have, for example, a 12 MW hour capacity. Likewise, multiple integrated electrical power units may be connected in series-parallel to create, for example, a 12 MW hour capacity. In the example, each integrated electrical power unit has a 4 MW hour capacity (as shown in the Figure), when the four integrated electrical power units are supplying backup power to the building then their combined capacity would be 16 MW of electrical power for one hour. However, in the 4-for-3 redundant electrical power distribution scheme they will have a rated 12 MWh capacity. The BESSUPS system 100 with one or more integrated electrical power units can be sized in electrical power capacity to support small data hall demands or sized in electrical power capacity to support large micro-grids.

Next, the BESSUPS system 100 uses a scalable amount of integrated electrical power units, typically one per power supply line coming from the utility power grid into the micro electrical power grid. An instance of the integrated electrical power unit is constructed to be scalable in an amount of capacity over time of its operation by having one or more electrical connections to add on an additional electrical power capacity by adding at least one of 1) another new set of back-up batteries and a new power conversion and conditioning module electrically in parallel to an existing set of electrical components (back-up batteries and a power conversion and conditioning module) of the integrated electrical unit. The new and existing electrical components all connect to the magnetic coupling choke, which is already installed and 2) an expansion connection to add a number of blocks of back-up batteries to existing back-up batteries in the battery storage plant 110 for that integrated electrical unit. Each integrated electrical power unit can have a scalable amount of batteries, electrically connected in series-parallel, to be able to supply electrical power for the micro power grid for a data center, a hospital, a manufacturing facility, etc., where the voltage and frequency of the AC and DC power needs to be maintained within very tight tolerances. The BESSUPS unit supplies continuous condition electrical power to critical loads in the downstream facility, through its universal power supply portion of the BESSUPS.

The controller of the integrated electrical power unit has a remote electrical tap and sensor to sense characteristics of the AC power coming from the main AC power source. The sensing of the AC power on this input feed line occurs far enough upstream from the magnetic coupling choke (e.g., line-interactive inductor coupling coil) itself that there will be no interruption of AC power 1) when the power from the utility grid drops out and the AC power coming from the integrated electrical power unit through the line interactive inductor coupling coil now supplies the micro grid. The sensing of the mains can be done with a sensor configured to sense voltage and frequency. Both voltage and frequency are measured inside the sensor. Voltage is measured on all three phases. Frequency is also measured on all three phases. When any of these parameters go outside allowable limits, then the controller acts to swap supply power from the utility grid over to the power converter module of the integrated electrical power unit.

The integrated electrical power unit converts the fluctuating AC voltage level, frequency range, etc., from the utility grid over to providing continuous conditioned electrical power to critical loads inside the facility/building without any fear that there can be a momentary drop in voltage or loss in power. Again, the magnetic coupling choke (e.g., line-interactive induction coupling coil) and the controller cooperate to use a remote sensor to sense the characteristics of the AC power coming in from the utility grid power line far enough upstream from the magnetic coupling choke itself, such as 15 milliseconds or greater, between the sensed AC power location and the location on the power feed line where the magnetic coupling choke electrically couples the integrated electrical power unit onto the electrical power line going to the step down transformer or switchboard in the facility.

The integrated electrical power unit may replace a typical emergency backup power supply, such as a diesel generator and/or mechanical rotational power supply. Each integrated electrical power unit operates via 1) chemical energy storage in the batteries versus 2) a liquid Energy Storage System (ESS) such as the diesel generator or 3) a mechanical energy storage system such as a flywheel. Note, the integrated electrical power unit with its battery storage plant 110 requires much less maintenance than a diesel generator or mechanical energy storage system. In addition, the integrated electrical power unit with its electrical power conversion and conditioning module has a lower amount of noise decibels than a diesel generator backup power supply. The integrated electrical power unit with its electrical power conversion and conditioning module and battery storage plant 110 also does not emit carbon-based gases when operating.

Figure 2:
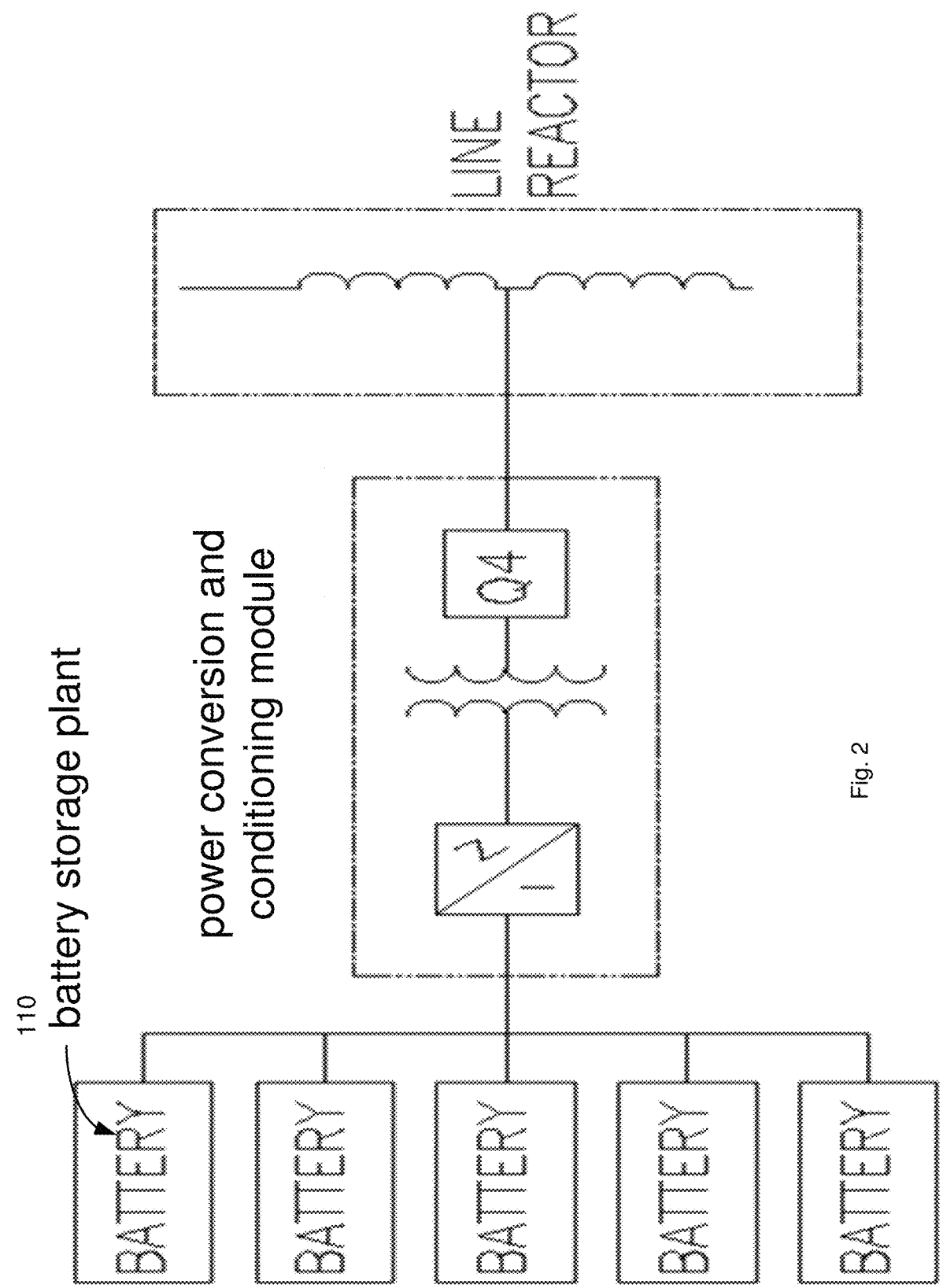
FIG. 2 is a single line diagram of an embodiment of an integrated electrical power unit configured to include a battery storage plant and a power conversion and conditioning module configured to electrically couple to a magnetic coupling choke to form a line reactor.

FIG. 2 is a single line diagram of an embodiment of an integrated electrical power unit configured to include a battery storage plant and a power conversion and conditioning module configured to electrically couple to a magnetic coupling choke to form a line reactor.

The integrated electrical power unit includes a battery storage plant 110 and a power conversion and conditioning module configured to electrically couple to a magnetic coupling choke to form a line reactor. The magnetic coupling choke can be constructed to be a multiple-winding, center-tapped, magnetic coupling choke (e.g., inductor/line reactor) that is configured to connect the AC power output of the electrical power conversion and conditioning module.

The electrical power conversion and conditioning module can include a bi-directional inverter which can use utility power to charge the systems batteries.

The electrical power conversion and conditioning module converts an AC voltage input to a DC voltage in the battery storage plant 110 and then the electrical power conditioning portion converts the DC voltage back out as continuous conditioned AC voltage with a transformer to step up the output voltage to whatever the line voltage is supposed to be at as well as produces an Uninterruptible Power System (UPS) to compensate for any deficiencies from the main source of power AC volts. The step up transformer steps up the inverter output voltage. The line interactive UPS technology to supply the continuous conditioned AC voltage makes sure no spikes or underswings in the supplied line AC voltage level, frequency, phase, or other characteristics from the electrical power conversion and conditioning module to the critical electrical equipment loads in the downstream facility.

The battery storage plant 110 combines a set of battery backup power packs coupled to the power converter with electrical inverters and power conditioning module with an uninterruptible power supply with a line reactor/magnetic choke to supply backup AC power in both 1) when deficiencies occur from the line voltage, frequency or other characteristics such as unacceptable swings in the voltage or frequency cycles coming from the utility grid's AC power feed, as well as 2) when a total loss of power occurs from the utility or other main power source. Each battery backup power pack may be located in a conditioned room at a controlled temperature and have its own dedicated cooling system.

In an example, the magnetic coupling choke can contain an outer rotor that contains a two pole three-phase winding that accelerates the free spinning inner rotor when the utility grid is supplying power to the power line. When the utility grid fails to provide AC power within allowable limits, the magnetic coupling choke retrieves power from the kinetic energy of the inner rotor by energizing the DC winding of the outer rotor. The amount of energy available from the inner rotor is more than adequate to bridge the time required for the battery backup power pack and the power converter module including an inverter to ramp up to normal AC voltage level and power. Thus, once utility power fails or falls outside of its tolerance, then the magnetic coupling choke (e.g., a line-interactive induction coupling coil) engages and the power conversion and conditioning module including the inverter takes over supplying power to the power line. The magnetic coupling choke may connect the battery backup power pack in parallel, as opposed to series, with the utility grid power supply.

The filters and voltage regulators in the uninterruptible power system of the power conversion and conditioning module generally puts out 3 phase, 3 wire AC power, AC Voltage level adjustable between 5 kV-35 kV, Voltage Regulation+/−1% (0-100% balanced load), Voltage Adj. Range+/−3.0%, THD (VOUT)<2% THD at 100% linear load; <5% THD at 100% nonlinear load, a Crest Factor 2.3, a Maximum Efficiency for (AC voltage input to AC voltage output) 97.0%, and a Maximum Efficiency (DC voltage input to AC voltage output) 96.5%.

The integrated electrical power unit is configured to electrically couple to a magnetic coupling choke to form a line reactor to provide UPS components that include a Voltage stabilizer, a filter of higher harmonics from mains to load v.v, a power factor corrector during normal operation, an emergency energy supply system and controller. Filtering of higher harmonics can be achieved by an electrical filter consisting of the tapped magnetic coupling choke and a synchronous AC Machine. This filter can have the following functions: i) stabilizing mains voltage variations of + or −10% to less than + or −1% at load side, ii) reducing the total harmonic distortion from mains to load v.v. with about 95%, and iii) reducing peaks, sags, etc. from the mains supply into direction of the load. Note, a secondary winding can significantly improve the system response to voltage variations. An arrangement of a tapped reactor of the magnetic coupling choke and an idle running AC synchronous machine acts as an excellent stabilizing filter. The reactor is selected such that the impedance is equal to four times the synchronous sub transient reactance Xo" of the synchronous machine, with mutual coupling across the full length of the reactor. The synchronous machine is connected at a tapping point 75% along the electrical length of the reactor. Accordingly the reactance of the reactor from the tapping point to the load is equal to the sub transient reactance.

Voltage Stabilization

The synchronous AC Machine can be considered as a voltage source with an internal impedance equal to the sub transient reactance. For a full three phase short circuit on the input side of the UPS system, the voltage at the tapping point of the reactor, in sub transient time range, is 75% of the source voltage. However, by auto transformer action, a voltage rise of 25% of the source voltage occurs towards the load terminals. Accordingly, the voltage at the load terminals remains constant at 100%.

The effect of transient and very slow phenomena of fundamental voltage on load side is compensated by the excitation of the synchronous AC Machine and an automatic voltage regulator.

In an embodiment, the power conversion and conditioning module can be implemented as two discreet modules where the power conversion module performs electrical power conversion from AC power to DC power into the batteries and DC power to AC power into the power conditioning module. The power conditioning module uses its UPS components including a voltage regulator and filters to supply out of the electrical power conditioning module to be an uninterruptible supply of regulated and conditioned AC power to stay within a set voltage level and frequency range.

Figure 3:
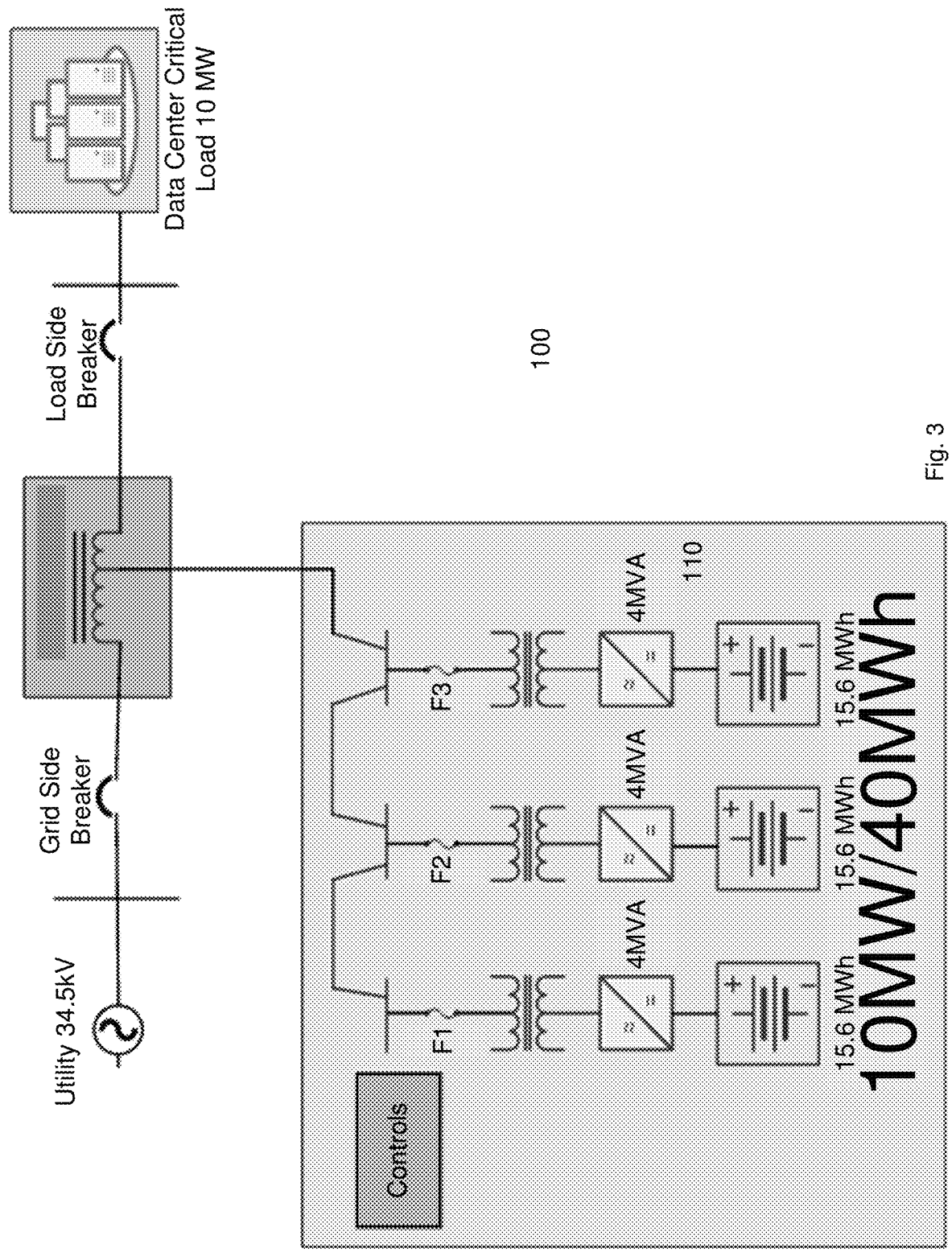
FIG. 3 is a single line diagram of an embodiment of the integrated electrical power unit connected electrically in parallel to the magnetic coupling choke.

FIG. 3 is a single line diagram of an embodiment the integrated electrical power unit connected electrically in parallel to the magnetic coupling choke.

The integrated electrical power unit electrically connects downstream of the magnetic coupling choke. The integrated electrical power unit can connect to the load side circuit breaker which connects to critical electrical equipment loads in the Data Center. Note, the critical electrical equipment loads in the Data Center may have a maximum of, for example, 10 MWs as a maximum anticipated electrical load at a time in the future when all of a possible electrical equipment loads are housed in the facility connecting to the integrated electrical power unit. The integrated electrical power unit connects upstream of the magnetic choke to the grid side circuit breaker which is fed by the utility electrical power lines at, for example, a voltage of 34.5 kV. The integrated electrical power unit in this example has three parallel electrical circuits of battery storage plants 110, bi-directional power conversion and conditioning modules with their coils, fuses, filters, and regulators. The controller cooperates with the rest of the components in the integrated electrical power unit to supply AC power supplied to the electrical equipment loads while also compensating for any deficiencies from the AC power coming from the main AC power source to maintain an AC power supplied to the electrical equipment loads to stay within a set AC voltage level and frequency range.

In an embodiment, the magnetic coupling choke can be constructed to be a single winding reactor. The integrated electrical power unit is connected electrically in parallel to the magnetic coupling choke. An input connection to supply the AC power from the main AC power source to the electrical power conversion and conditioning module connects electrically upstream of the magnetic coupling choke. An output from the electrical power conversion and conditioning module connects downstream of the magnetic coupling choke to supply its portion of the AC power to the electrical equipment loads from AC power output of the electrical power conversion and conditioning module.

Figure 4:
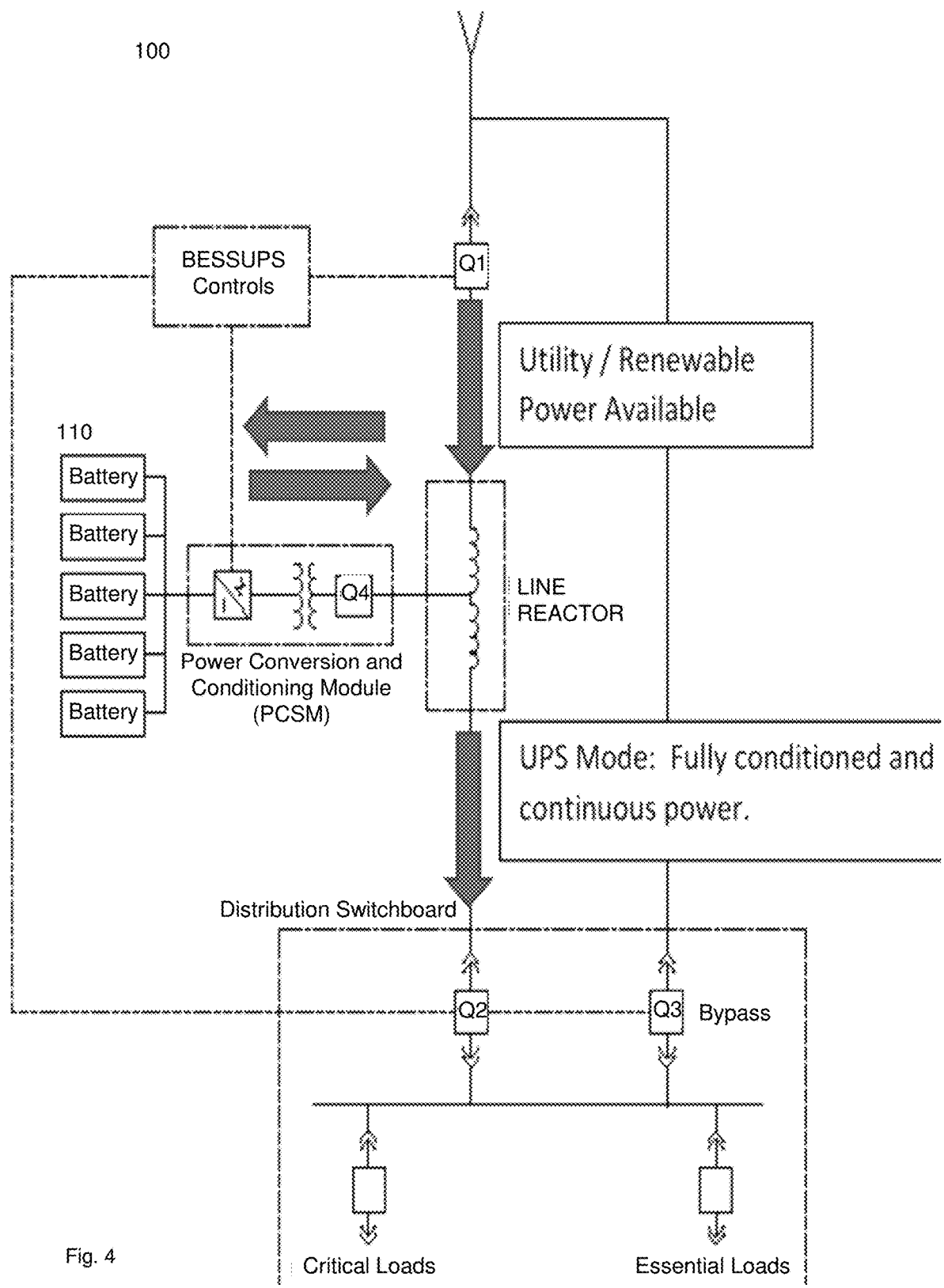
FIG. 4 is a single line diagram of an embodiment that presents an example power flow when the controller of the integrated electrical power unit puts the integrated electrical power unit and an associated set of circuit breakers into an uninterruptible power supply mode.

FIG. 4 is a single line diagram of an embodiment that presents an example power flow when the controller of the integrated electrical power unit puts the integrated electrical power unit and an associated set of circuit breakers into an uninterruptible power supply mode.

The controller allows the integrated electrical power unit to operate in multiple modes. The integrated electrical power unit has a controller and its associated set of circuit breakers in the BESSUPS system 100 that can be programmed, to control how to operate an electrical distribution system in different operational modes. The controller electrically couples to the associated set of circuit breakers in an electrical distribution system to control an electrically open state or closed state of the set of circuit breakers to put both an electrical distribution system and the integrated electrical power unit into multiple different operational modes. Some example modes are:

ESS Mode: Using utility, wind or solar power to charge the system batteries.

Uninterruptible Power System (UPS) Mode: As an Uninterruptible Power System (UPS) to provide conditioned continuous power.

Standby Power Mode: To replace diesel/fossil fuel generators to provide backup power during utility outages.

PJM Interconnection Mode: To provide voltage and frequency stabilization for PJM Interconnection Standard Utility Power Grid support.

Concurrent Operations Mode: Support both the UPS and PJM Mode at the same time.

Demand reduction Mode: To participate in utility reduced demand programs or used during peak rate periods for peak energy shaving opportunities.

Bypass mode: Allows the BESSUPS system 100 with an integrated electrical power unit to be taken offline for maintenance or repair.

As discussed, FIG. 4 shows the controller has the components of the integrated electrical power unit and its associated set of circuit breakers in the electrical distribution system to operate in a UPS mode. In the UPS Mode, the power conversion and conditioning module supplies an uninterruptible, fully conditioned, and continuous power to critical and essential electrical loads in the micro grid. In the UPS Mode, this integrated electrical power unit coupled to the magnetic coupling choke provides both functionalities of conditioned power for critical loads in a downstream facility and then when required can also be an emergency backup power source when electricity from the utility power grid or another source main electrical power source becomes unreliable or goes away, which is situated between the electrical power lines of the utility grid and a circuit breaker of a distribution switchboard of the facility. When configured to operate in Uninterruptible Power System (UPS) the controller sends control signals close the Q1, Q2 and Q4 circuit breakers. The controller will then monitor the incoming voltages, those voltages on the line side of the line reactor for any power anomalies. During normal operations, the controller sends control signals to use the batteries in the battery storage plant 110 and the inverters the power conversion and conditioning module to:

Provide regulated voltages to the load side of the line reactor.

Sink or source demand VARS as necessary.

Correct the line reactor line side power factor to unity.

And, the line reactor formed from the integrated electrical power unit electrically coupled to the magnetic coupling choke reduces or eliminates load driven harmonics. Typical THD for the line reactor is <2%.

In an operational mode, electrical equipment loads can be supplied from the utility grid with conditioning provided by the integrated electrical power unit coupled to the magnetic coupling choke. The integrated electrical power unit will maintain minimum power consumption to maintain the DC bus voltage. Also in a loss of reliable service (not a fault condition): then the controller will send control signals for the battery storage plant 110 and the power conversion and conditioning module to pick up the electrical equipment load and supply AC power.

Next, FIG. 4 also shows the controller of the integrated electrical power unit connected to an electrical tap and sensor to sense characteristics of the AC power coming from the main AC power source. The electrical tap and the sensor connect at a distance far enough upstream of the magnetic coupling choke to combine with the magnetic coupling choke being constructed to have an enough amount of impedance in order to delay a drop off in voltage level when the AC power from the main AC power source is either unreliable or going away so that then the controller can both change an operational mode of the integrated electrical power unit and its associated breakers without a disruption to the downstream electrical equipment loads. One or more instances of the integrated electrical power units will now electrically couple to 1) be a sole source of continuous emergency backup source of AC power to supply all of the electrical equipment loads connected downstream to the integrated electrical power unit within the regulated and conditioned set AC level and frequency range to the critical electrical equipment loads in the facility as well as 2) change an open status or closed status of one or more circuit breakers in order to electrically isolate the electrical equipment loads from the main AC power source.

The line reactor/magnetic coupling choke/line reactive coupler is designed to isolate the downstream electrical distribution system when adverse electrical power events happen on the utility electrical power supply side. The magnetic coupling choke is designed and constructed to prevent any moments of no longer having any AC power for the critical electrical equipment loads (that need continuous conditioned power) to operate within the set AC voltage and frequency range when the utility voltage goes to zero. The line reactor formed with the magnetic coupling choke provides a big enough impedance in between the utility power supply and the inverter output of the BESSUPS system 100 with an integrated electrical power unit to allow enough time, such as 15 milliseconds or more, for the controller to be able to open and/or close one or more key circuit breakers to 1) isolate from the utility power source and swap operational modes so that the BESSUPS system 100 with the one or more instances of the integrated electrical power unit now becomes the emergency backup source of power to both provide emergency power to the critical loads without any loss in power sensed by those critical electrical equipment loads and as well supply the conditioned electrical power within the set AC voltage and frequency range to those critical electrical equipment loads. Note, the Q1 circuit breakers and other circuit breakers do not electrically open or close instantaneously but rather it takes several milliseconds to change state (for example, six cycles in a 60 Hz electrical signal). The Q1 circuit breaker senses an outage and opens up the circuit breakers to electrically isolate in about six cycles. The integrated electrical power unit also changes modes to anticipate no more AC power in from the Main AC power source and does not shut down but instead sets up to supply the conditioned electrical power within the set AC voltage and frequency range needed by the critical electrical loads and while now also being the sole source of creating that supplied power rather than merely acting as a UPS to receive an input AC power, monitor and modify that input AC power, and then output conditioned electrical AC power to those critical electrical equipment loads within the set AC voltage and frequency range needed by the critical electrical loads in the downstream facility.

The line reactor is constructed with a balance of what is a minimum amount (e.g., how big) of an impedance the line reactor needs to have between the utility power supply and the inverter output of the power conversion and conditioning module in order for the integrated electrical power unit to not want to shut down or overload because the one or more instances of the integrated electrical power units are now trying to be the sole source of power for the entirety of all of the critical electrical equipment loads in the downstream facility.

The line reactor formed by the magnetic coupling choke coupled to the coils in the power conversion and conditioning module puts enough of an electrical resistance (e.g., ohms) between the output of that power conversion and conditioning module and the utility grid connection to the microgrid so that when AC power from the utility grid goes away, then the line reactor acts as a big load electrically in parallel with the critical electrical equipment loads in the downstream facility. The line reactor design can be up to 60% of the impedance of an amount calculated for the critical electrical equipment loads in the downstream facility. The line reactor formed by the magnetic coupling choke coupled to the coils in the power conversion and conditioning module create a series voltage divider network between the integrated electrical power unit and magnetic coupling choke on one side of the series voltage divider network and on the other side of the series voltage divider network is the facility and its electrical equipment loads. The voltage drop will be the electrical current (amps) times the resistance/impedance. Thus, the construction of the line reactor makes the coils of the line reactor large enough in thickness/electrical gauge size to handle the electrical current. Theoretically, the electrical distribution system with the one or more instances of integrated electrical power units and their corresponding magnetic coupling choke could lose up to 60% of the voltage level (which would fall well below minimum voltage level required for most of the critical electrical equipment in the facility) supplied by the utility if the system didn't have that the supplemental conditioned electrical power out of the battery storage plant 110 of the integrated electrical power unit being added back in where an output of the power conversion and conditioning module connects back into the electrical line connecting to the downstream circuit breaker of the facility and its electrical equipment loads. The size and impedance of the line reactor is balanced on the top amount of impedance value by the UPS portion of the power conversion and conditioning module, during normal operations when the system is running on utility power, then the AC power coming from the power conversion and conditioning module needs to compensate for that voltage loss across the line reactor to ensure a constant satisfactory AC voltage level is supplied after the line reactor to the electrical equipment loads in the facility.

An example Calculation of the magnetic coupling choke impedance:

To get an idea of the necessary impedance of the magnetic coupling choke, the following rule of thumb can be used Xsm=total series impedance of choke (no current in tap) [Ohm] Uff=rated UPS output voltage (phase-phase) [Volt] Sups=rated apparent power of UPS [V.A.]

$$\text{Rule of thumb: } Xsm = 0.58 \times \{Uff2/Sups\} \text{ Ohms}$$

This formula corresponds with approx. 27-28 degrees phase-shift over the choke in case the UPS operates in full-load mains-operation (=normal operation). Note, the power conversion and conditioning module also has a regulator to control an amount of phase shift in the AC power supplied from the power conversion and conditioning module.

The example calculation can be
assume: Sups :::: 1400 KVA
Assume: Uff=6.6 KV $$Xsm = 0.58 \times \{6600^2/1.4 \times 10^6\} = 18.0 \text{ [Ohms]}.$$

This calculation can factor in various factors such as
M=mutual inductance between prim coil and sec. coil [Henry]
Lp=self inductance prim. coil [Henry]
Ls=self inductance of sec. coil [Henry]
Np=number of turns on prim. coil
Ns=number of turns on sec. coil
N=Np/(Np+Ns)=winding ratio
fund=electrical fundamental frequency [Hz]
XR=series reactance of the line reactor (if no current in tap) at the fund frequency measured in 'x' amount of ohms.

In a version of the UPS operational mode, the main AC power source is configured to provide a first portion of AC power supplied to the electrical equipment loads that receive power from the integrated electrical power unit. The power conversion and conditioning module is configured to supply the other portion of the regulated and conditioned AC power supplied to the electrical equipment loads in order to stay within the set voltage level and frequency range from the electrical power conversion and conditioning module by compensating for any deficiencies from the AC power coming from the main AC power source to maintain a combined AC power supplied to the electrical equipment loads to stay within the set AC voltage level and frequency range.

Note, the BESSUPS system 100 with one or more integrated electrical power units can store energy supplied from a utility grid power source, and/or wind or solar energy sources eliminating the need for fossil fuels. A BESSUPS system 100 with one or more integrated electrical power units can be integrated into local or remote renewable power systems, such as wind or solar energy, which can be located locally or remotely. The electrical power lines of a utility power grid can be the main source of AC power, and/or power lines from wind or solar energy sources can be the main source of AC power.

The BESSUPS system 100 with one or more integrated electrical power units is easily expandable both in size capacity and duration for supplying that power.

The BESSUPS system 100 with one or more integrated electrical power units is considerably less expensive to install and operate than traditional static or flywheel UPS and diesel generator systems.

The BESSUPS system 100 with one or more integrated electrical power units can be configured in multiple redundant electrical power supply configurations (e.g., N+1 configurations, 2N configurations, etc.).

Figure 5:
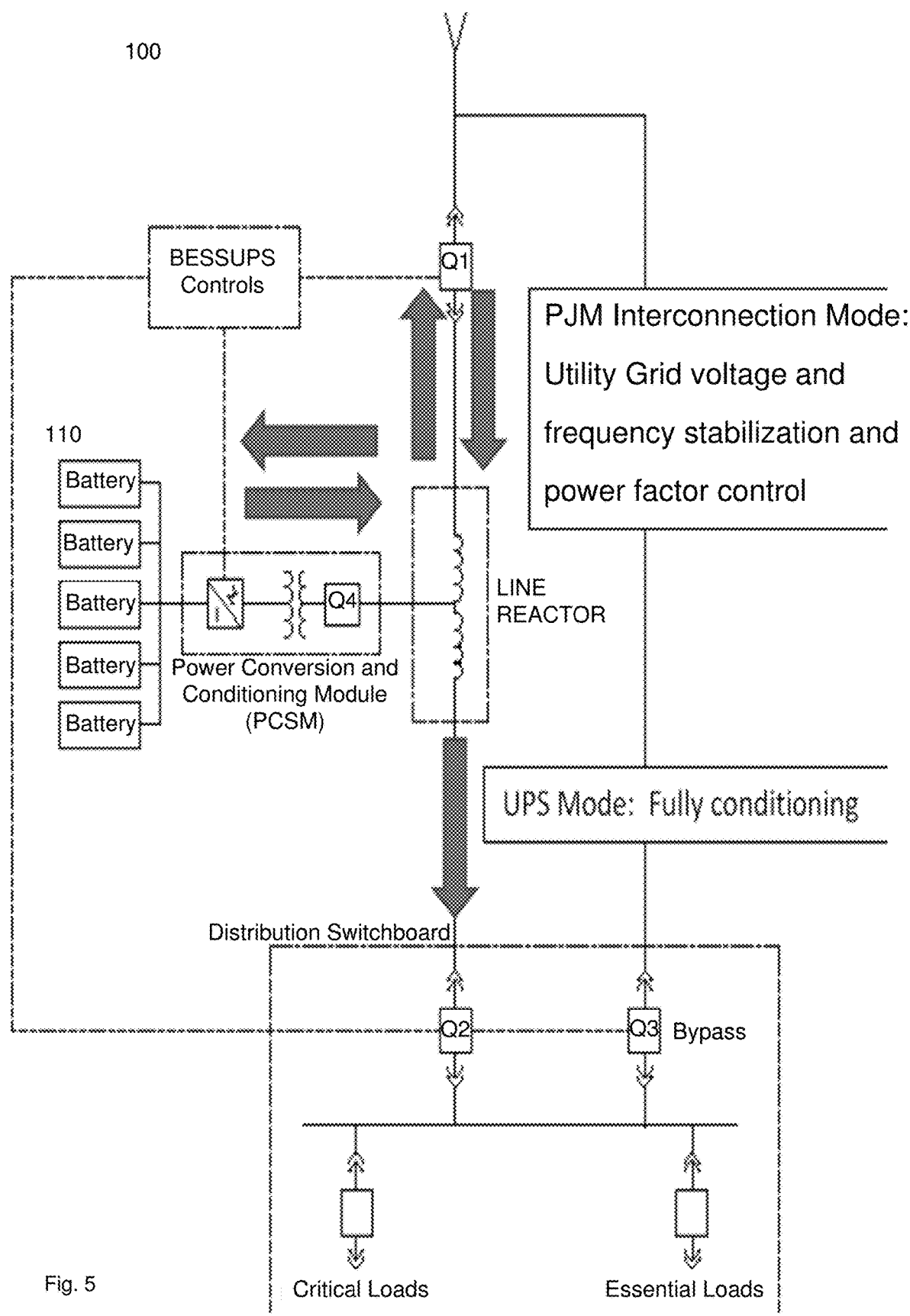
FIG. 5 is a single line diagram of an embodiment that presents an example power flow when the controller of the integrated electrical power unit puts the integrated electrical power unit and an associated set of circuit breakers into a concurrent UPS/PJM operation mode operating both as i) a UPS for electrical loads in the facility as well as ii) providing utility grid support.

FIG. 5 is a single line diagram of an embodiment that presents an example power flow when the controller of the integrated electrical power unit puts the integrated electrical power unit and an associated set of circuit breakers into a concurrent UPS/PJM operation mode operating both as i) a UPS for electrical loads in the facility as well as ii) providing utility grid support.

Concurrent UPS/PJM Mode:

The controller will send control signals to the BESSUPS system 100 with one or more integrated electrical power units to concurrently operate as a UPS and to provide utility grid support. Circuit breakers Q1, Q2 and Q4 are sent control signals to electrically close. The controller in the BESSUPS system 100 will monitor and respond to anomalies on the line and load sides of the coupling line reactor. The controller provides utility grid support by controlling the integrated electrical power unit to supply power to the electrical grid to stabilize the characteristics of the AC power on the utility grid while the electrical load continues to be serviced. The controller and integrated electrical power unit provide utility grid frequency regulation, voltage stabilization and power factor correction support. Note, in the event of a power outage on the utility grid side, the controller sends control signals for the integrated electrical power unit and the associated set of circuit breaker to revert a traditional UPS operation supporting the critical loads. The controller is configured to place the integrated electrical power unit and the associated set of circuit breakers into a concurrent UPS/PJM operational mode to electrically connect the AC power output of the power conversion and conditioning module to the electrical power lines of the utility power grid to provide frequency regulation, voltage stabilization, and power factor correction on the utility grid in order to support both 1) AC power on the utility grid power itself as well as 2) to the electrical equipment loads in the micro grid downstream of the integrated electrical unit. Thus, the battery storage plant 110 and the power conversion and conditioning module of the integrated electrical power unit are configured to supply the regulated and conditioned AC power to stabilize AC power, such as voltage level, etc., on the utility power grid while the electrical equipment loads in the facility continue to be serviced with the AC power at the set regulated and conditioned AC voltage level and frequency range from the power conversion and conditioning module.

A BESSUPS system 100 with an integrated electrical power unit and its controller are constructed to meet PJM regulation market utility grid support requirements.

Demand reduction Mode: The controller will send control signals to the BESSUPS system 100 with one or more integrated electrical power units to situationally participate in utility reduced demand programs or be used during peak rate periods/peak shaving. Many utilities offer incentives to reduce demand during peak consumption events. Typically these are during the summer when demands can exceed the utility's generation capabilities or programs or used during daily peak rate periods. A BESSUPS system 100 with an integrated electrical power unit provides an opportunity to participate in a demand reduction or a peak shaving program can provide substantial financial payback opportunities.

Next, all of i) the magnetic coupling choke, ii) one or more of the circuit breakers electrically coupled to the controller, and iii) electrical power lines supplying AC power coming from a connection to the main AC power source to the integrated electrical unit, at their time of installation into an electrical distribution system, are constructed and sized at an electrical amperage rating to handle at least 125% of the maximum anticipated electrical load at a time in the future when all of a possible electrical equipment loads are housed in the facility (such as a 10 MW facility) connecting to the integrated electrical power unit as well as an electrical current demand of charging the battery storage plant 110 of the integrated electrical unit. The circuit breaker Q1, the line reactor, and power lines need to be sized at electrical amperage to handle 100% of the electrical equipment loads and then an additional 25% more to handle the batteries of the BESSUPS system 100 while they are periodically recharging. Thus, for example, the magnetic coupling choke (e.g., line reactor) has copper coil loops to handle expected current of up to 125% of the electrical equipment loads in the downstream facility.

Figure 6:
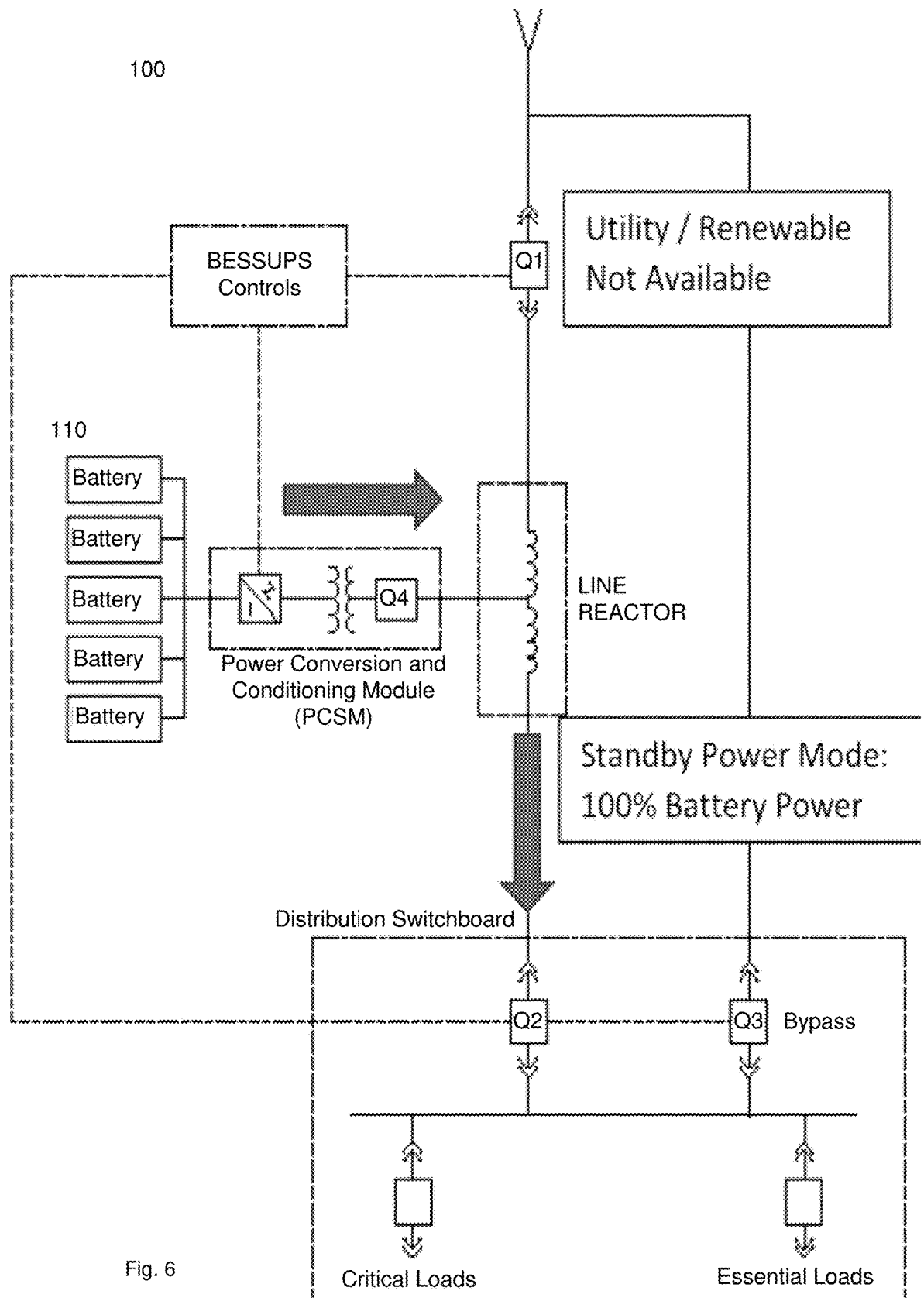
FIG. 6 is a single line diagram of an embodiment that presents an example power flow when the controller of the integrated electrical power unit puts the integrated electrical power unit and an associated set of circuit breakers into a Standby Power mode to provide standby/emergency power.

FIG. 6 is a single line diagram of an embodiment that presents an example power flow when the controller of the integrated electrical power unit puts the integrated electrical power unit and an associated set of circuit breakers into a Standby Power mode to provide standby/emergency power.

Standby/Back-up Power Mode: The integrated electrical power unit replaces equipment, such as diesel generators, to provide AC power during utility grid power outages.

The controller will send control signals to the BESSUPS system 100 with one or more integrated electrical power units to operate as a standby power system. The BESSUPS system 100 will be in 'NORMAL' UPS mode and/or Concurrent UPS/PJM Mode the majority of the time when utility power is lost. The controller will send control signals to electrically open the Q1 circuit breaker and signals that direct the inverters in the power conversion and conditioning module crank up to support 100% of the demand of the electrical equipment loads of the downstream facility with emergency back-up power while continuously providing fully conditioned power to the electrical equipment loads in the facility without a disruption to the downstream electrical equipment loads. Upon detection by the sensors of a faulted condition, the controller will also send control signals to the other circuit breakers to electrically separate the integrated electrical power unit from the utility grid system.

The controller and the power conversion and conditioning module can cooperate to control a phase shift of the AC power coming out of the power conversion and conditioning module during both 1) a normal operational mode as well as 2) during a recovery operational mode when the controller has previously changed a state of a circuit breaker to isolate the main AC power from both the integrated electrical power unit and the downstream electrical equipment loads, and now the controller needs to change the state of the circuit breaker to reconnect with the main AC power source supplying AC power to both the integrated electrical power unit and the downstream electrical equipment loads.

In a restoration operating mode from loss of utility power, the magnetic coupling choke and the controller cooperate to trip open the circuit breaker, for example, a 400 amp circuit breaker, going to the utility voltage line when the integrated electrical power unit is electrically coupled to the electrical power line going to the step down transformer (or switchboard in the facility) so that the supplied AC voltage is coming from the integrated electrical power unit and that this supply power will not be back fed into the utility voltage line. After the circuit breaker being open due to detecting a problem with the power from the utility grid, the example 400 amp circuit breaker between the utility grid and the integrated electrical power unit will close when the supply voltage from the integrated electrical power unit is synchronous with the utility (phase angle between generator and utility less than 9 degrees), the utility voltage is within limits.

The line reactor and controller of the integrated electrical power unit are configured to cooperate to cause phase shift of the AC electrical signal potentially making the AC power supplied by the utility potentially out of phase with the AC power supplied from the output of the line reactor. The angle of the voltage shifts (a phase shift) from the output of the line reactor. The sensors of the controller ensure the phase shift between AC power from the utility and AC power from the integrated electrical power unit are phase matched when the controller closes circuit breakers Q3 and Q2 at the same time. The controller and the power conversion and conditioning module cooperate so that the UPS AC power output is variably adjusted to match whatever frequency and/or phase angle from the AC power source. The controller will actually adjust the phase angle on the line reactor output to match the bypass so the controller can close the circuit breakers Q3 and Q2 at the same time, without any issues.

Figure 7:
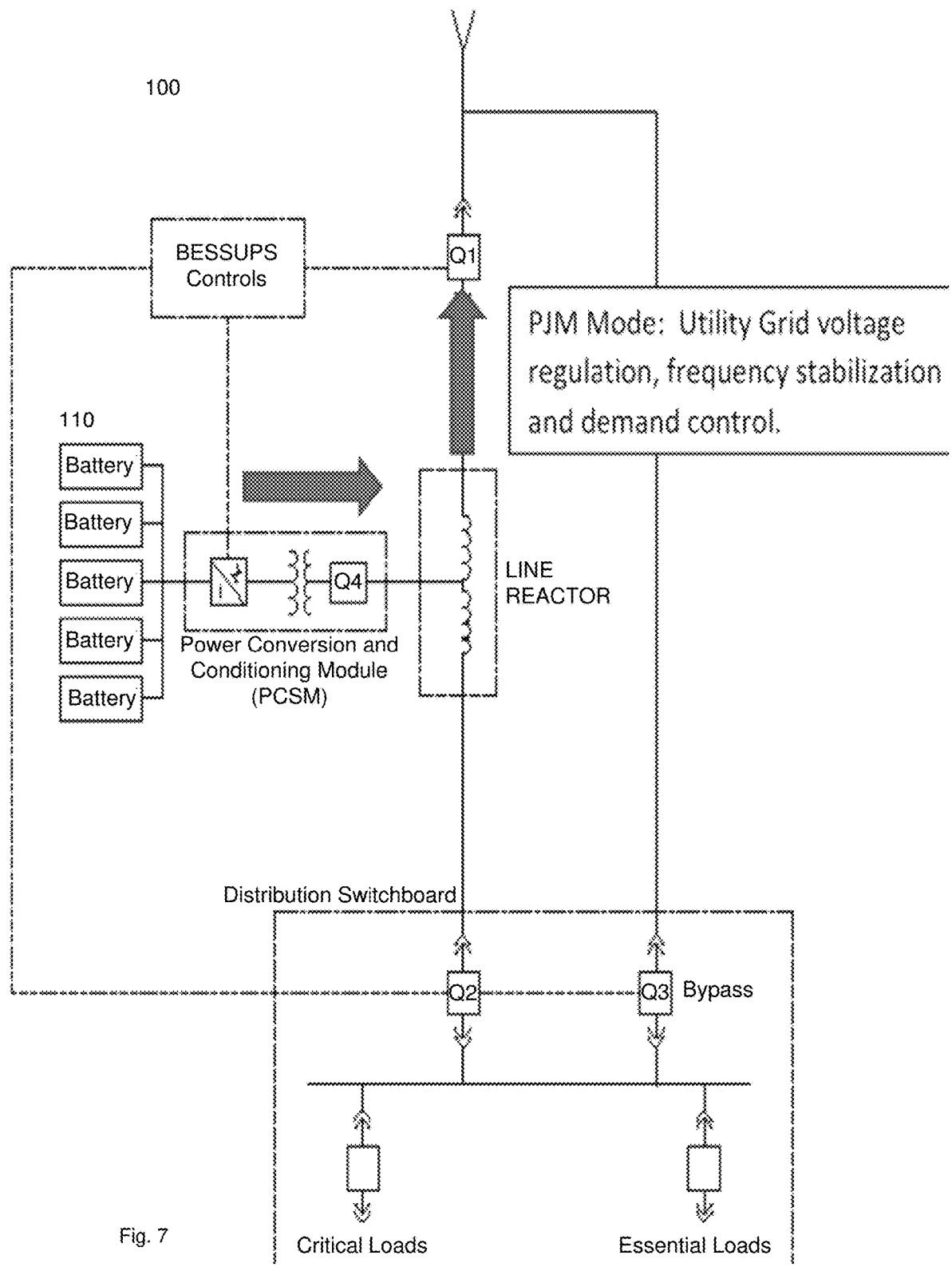
FIG. 7 is a single line diagram of an embodiment that presents an example power flow when the controller of the integrated electrical power unit puts the integrated electrical power unit and an associated set of circuit breakers into solely a Pennsylvania-New Jersey-Maryland (PJM) interconnection support mode.

FIG. 7 is a single line diagram of an embodiment that presents an example power flow when the controller of the integrated electrical power unit puts the integrated electrical power unit and an associated set of circuit breakers into solely a PJM interconnection support mode.

PJM Interconnection Mode: Provide PJM Interconnection Standard Utility Power Grid support.

The controller will send control signals to the BESSUPS system 100 with one or more integrated electrical power units and its associated circuit breakers to merely operate to provide utility grid support. When configured to operate in the PJM Interconnection support mode, the BESSUPS system 100 with its one or more integrated electrical power units will operate as grid connected Energy Storage System. In this configuration, the controller monitors the incoming power for voltage, frequency or power factor deviations. If a defect/variant is detected in the set range of the voltage, frequency, or power factor on the on the utility grid, then the controller will send control signals to the integrated electrical power unit to provide corrections for the voltage, frequency, or power factor for the grid voltage that is supplied to other micro grids.

Figure 8:
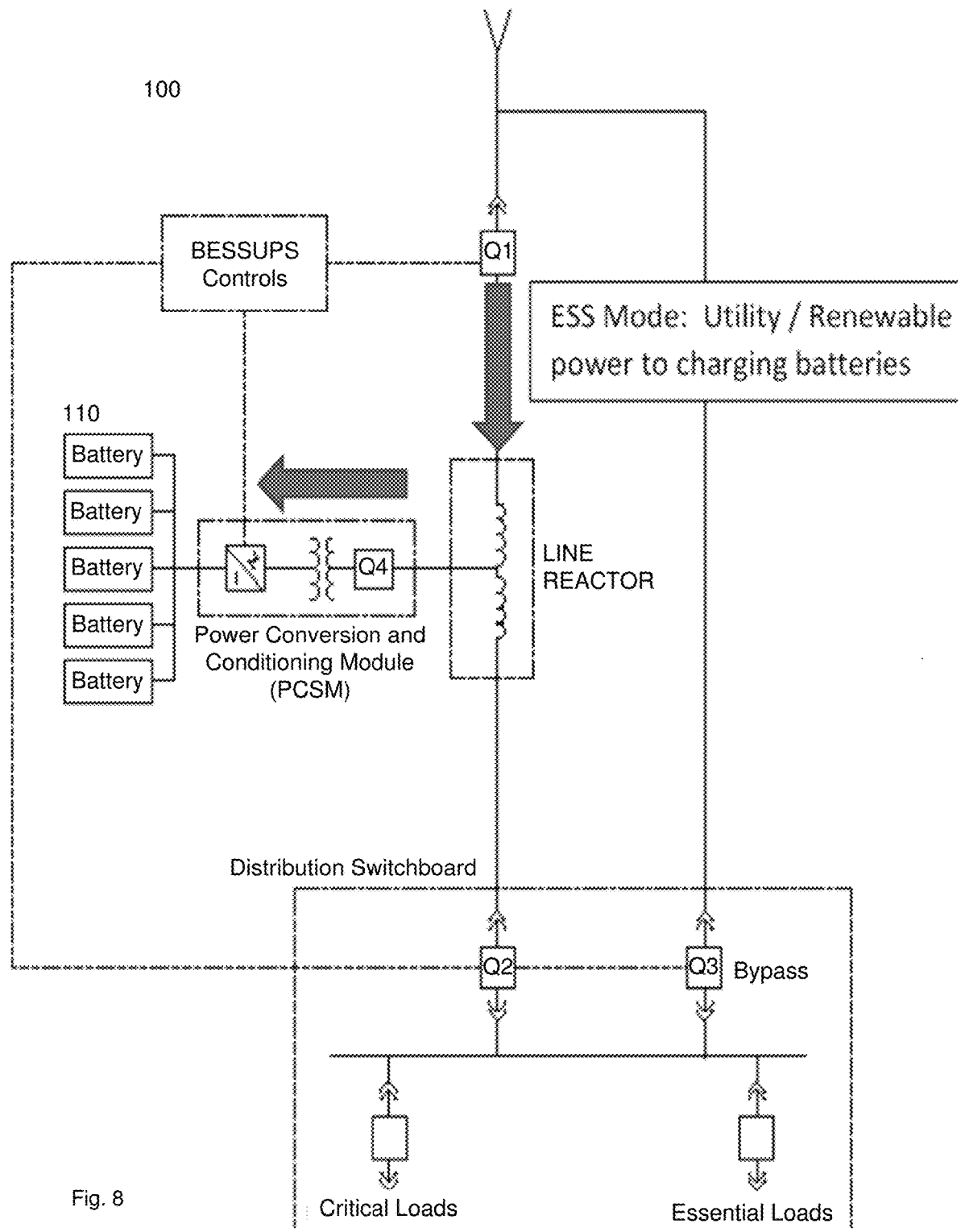
FIG. 8 is a single line diagram of an embodiment that presents an example power flow when the controller of the integrated electrical power unit puts the integrated electrical power unit and an associated set of circuit breakers into an ESS Mode charging the batteries in the battery storage plant.

FIG. 8 is a single line diagram of an embodiment that presents an example power flow when the controller of the integrated electrical power unit puts the integrated electrical power unit and an associated set of circuit breakers into an ESS Mode charging the batteries in the battery storage plant.

ESS Mode: The utility, wind or solar power source supplies AC power to merely charge the batteries in the battery storage plant 110. The controller will send control signals to the BESSUPS system 100 with one or more integrated electrical power units and associated circuit breaker to electrically close the Q1 and Q4 circuit breakers. The controller will send control signals to configure the bi-directional inverters in the power conversion and conditioning module to merely direct the incoming AC power to charge the batteries from the utility, wind or solar power sources. The controller will send control signals to configure the bi-directional inverters in the power conversion and conditioning module to stop supplying an AC power from its output.

Figure 9:
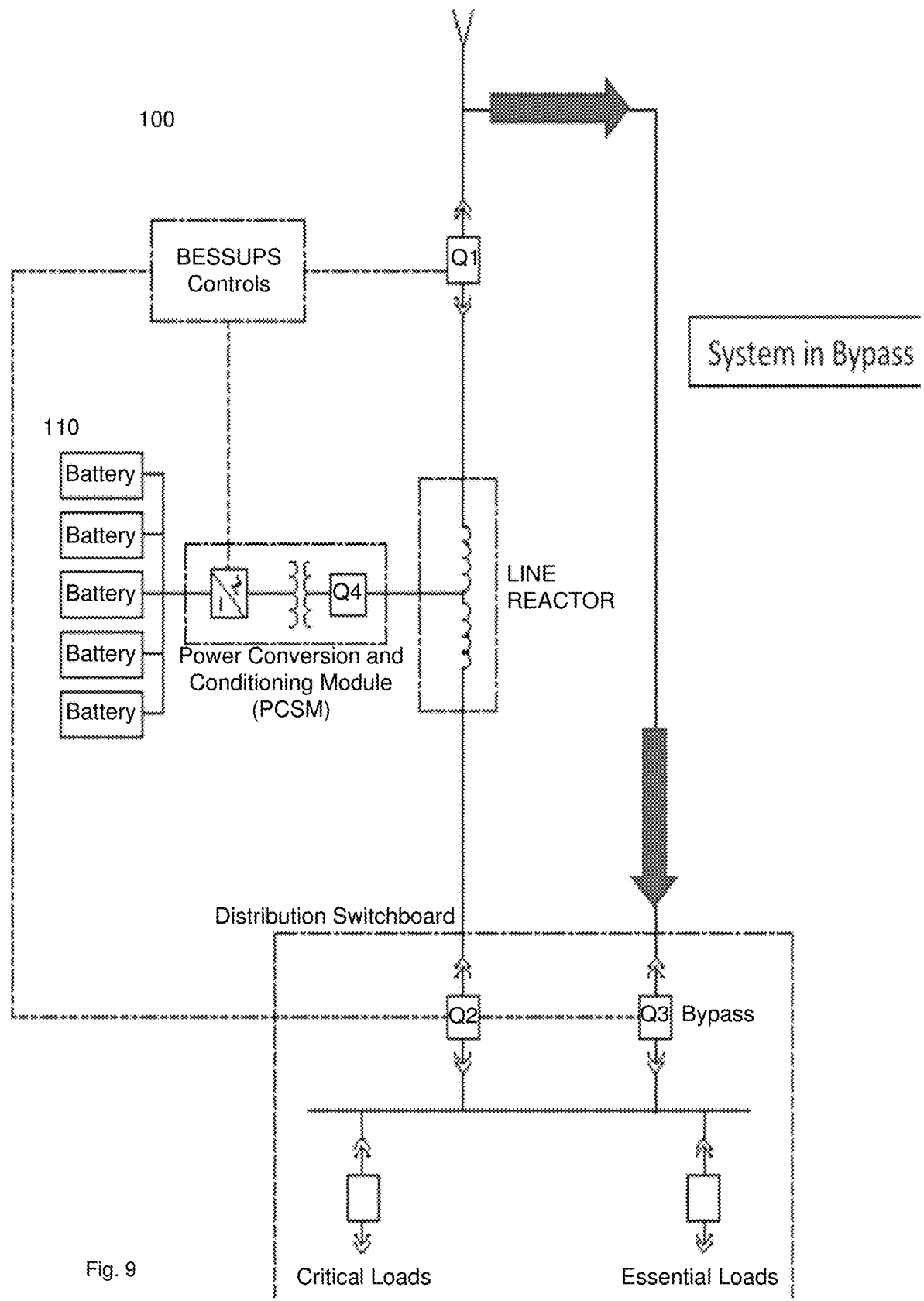
FIG. 9 is a single line diagram of an embodiment that presents an example power flow when the controller of the integrated electrical power unit puts the integrated electrical power unit and an associated set of circuit breakers into a Bypass mode.

FIG. 9 is a single line diagram of an embodiment that presents an example power flow when the controller of the integrated electrical power unit puts the integrated electrical power unit and an associated set of circuit breakers into a Bypass mode.

Bypass Mode:

The controller will send control signals to the BESSUPS system 100 with one or more integrated electrical power units to perform manually initiated transfers. Transfers between active and bypass operations. To transfer to bypass the controller will first close circuit breaker Q4 and then open circuit breakers Q1 and Q2. To transfer to active mode, the controller will first close circuit breaker circuit breakers Q1 and Q2 and then open circuit breaker Q4.

Figure 10:
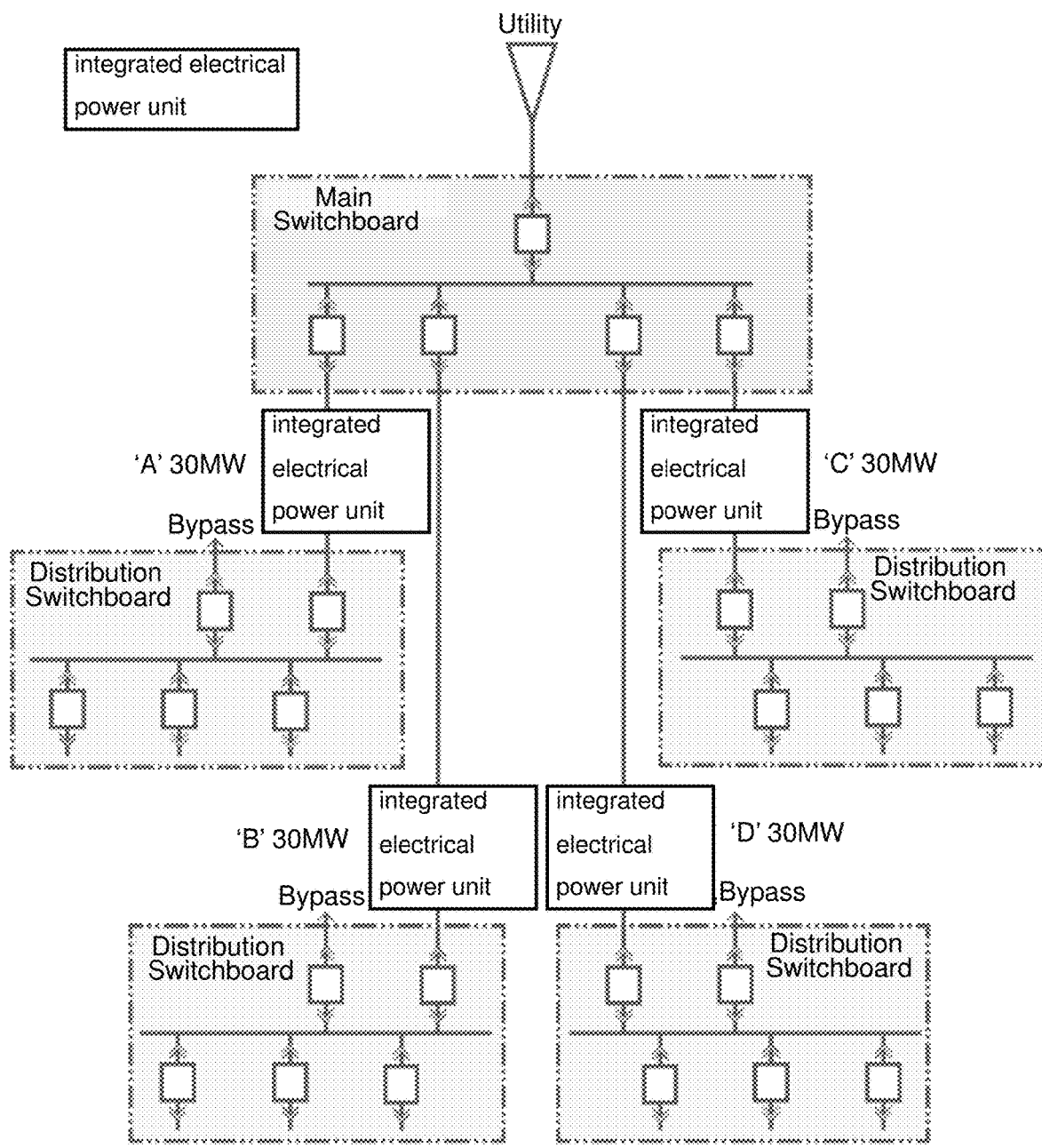
FIG. 10 is a single line diagram of an embodiment that presents an example 4-to-make-3 N+1 redundant electrical power distribution scheme with the BESSUPS system and its multiple instances of integrated electrical power units

FIG. 10 is a single line diagram of an embodiment that presents an example 4-to-make-3 N+1 redundant electrical power distribution scheme with the BESSUPS system and its multiple instances of integrated electrical power units. The multiple discreet integrated electrical units are configured to connect to both the main source of AC power and to the electrical equipment loads in the downstream facility to form one or more multiple redundant electrical power distribution schemes/power supply configurations. In this example, a 4-to-make-3 N+1 scheme but could also be e.g., another N+1 configuration, a 2N configuration, etc. The BESSUPS system 100 with an integrated electrical power unit can be easily configured into multiple redundant electrical power scenarios to electrical equipment loads, such as pumps, servers, etc., in its power distribution. The BESSUPS system 100 with one or more integrated electrical power units can be configured to meet all four Uptime Institute Tier levels.

As shown in the FIG. 10 there are, an example, four electrical power line feeds coming from the utility grid's power lines, each with an example input circuit breaker (Q1 and Q5-Q8) in the main switchboard tied to the associated controller of the corresponding integrated electrical power unit (e.g., integrated electrical power unit labeled 'A' 30 MW). Each power line feed goes to a separate step down transformer in order to feed AC power at a voltage of, for example, 480 VAC to the distribution switchboard distributing the AC power to the electrical equipment loads within a facility (the rectangular outline) of that micro grid, such as a data center, hospital, manufacturing facility, etc. in order to provide redundant backup power. In this example, a 4-for-3 redundant electrical power distribution scheme. The four separate distribution switchboard each receives its own AC power from its corresponding integrated electrical power unit (labeled A-D) and utility grid power line feed. Each distribution switchboard distributes electrical power to critical and/or non-critical electrical equipment loads in the micro grid. Inside the facility, each distribution switchboard also electrically connects to its redundant source of AC power that comes, via a power cable, from another distribution switchboard in the redundant electrical power distribution scheme.

Figure 11:
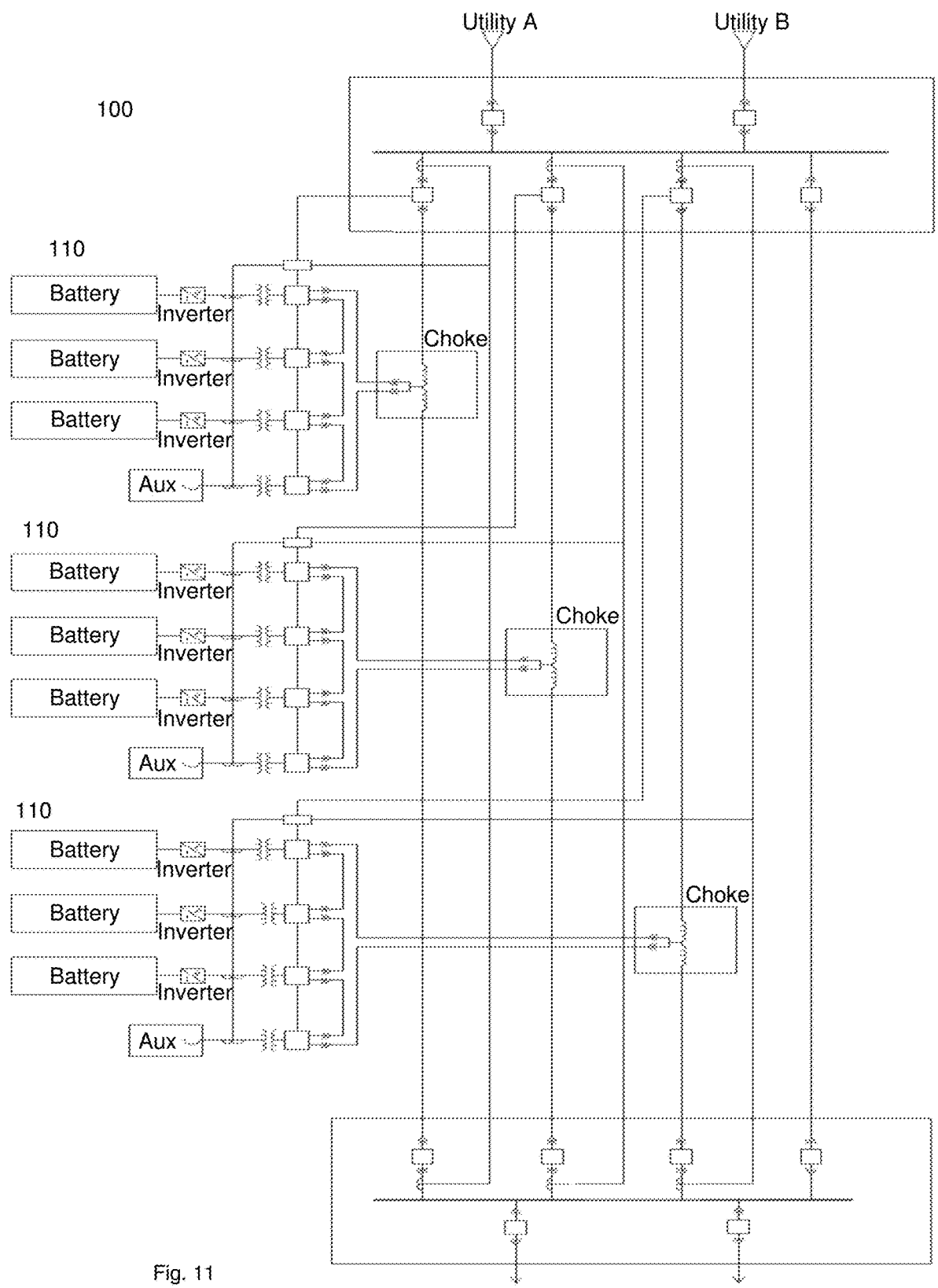
FIG. 11 is a single line diagram of an embodiment that presents an example 3-to-make-2 N+1 redundant electrical power distribution scheme with the BESSUPS system and its multiple instances of integrated electrical power units.

FIG. 11 is a single line diagram of an embodiment that presents an example 3-to-make-2 N+1 redundant electrical power distribution scheme with the BESSUPS system and its multiple instances of integrated electrical power units.

As discussed, each instance of the integrated electrical power unit is constructed to be scalable in an amount of capacity over time of its operation by having one or more electrical connections to add on an additional electrical power capacity. Each integrated electrical power unit can add on electrical power capacity by adding both of 1) another new set of back-up batteries in the battery storage plant 110 as well as and a new power conversion and conditioning module electrically in parallel to an existing set of two other sets of back-up batteries and power conversion and conditioning modules in the integrated electrical power unit. The new and existing electrical components all connect to the same/existing magnetic coupling choke, which is already installed. An expansion connection is constructed into the instances to add a number of blocks of back-up batteries to existing back-up batteries in the battery storage plant 110 for that integrated electrical unit.

FIG. 11 is a single line diagram of an embodiment that presents an example 3-to-make-2 N+1 redundant BESSUPS system with multiple instances of integrated electrical power units.

BESSUPS systems 100 are considerably less expensive to install and operate than traditional static or flywheel UPS and diesel generator systems. Each BESSUPS unit can add on additional electrical power capacity another set of back-up batteries, an inverter, and a power conditioning module electrically in parallel to the existing back-up batteries, an inverter, and a power conditioning module, where they all connect to a same already installed line reactor.

Scalability over time:

Building blocks are variable and can be scaled and/or paralleled over time for future expansion number of blocks of batteries in a BESSUPS unit.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The type of cabinets may vary, etc. The invention is to be understood as not limited by the specific embodiments described herein, but only by scope of the appended claims.

The invention claimed is:

1. An apparatus, comprising:
an integrated electrical power unit includes a battery storage plant, a controller, a power conversion and conditioning module,
wherein the power conversion and conditioning module includes i) electrical components configured to perform an electrical power conversion of alternating current (AC) power supplied from a main AC power source to direct current (DC) power provided to the battery storage plant, ii) electrical components configured to perform an electrical power conversion of DC power from the battery storage plant into AC power supplied out of the power conversion and conditioning module, and iii) electrical components configured to perform an electrical power conditioning of the AC power supplied from the power conversion and conditioning module to be an uninterruptible supply of regulated and conditioned AC power remaining within a set voltage level and frequency range to eliminate swings in voltage amplitude, frequency, or both voltage amplitude and frequency that are outside the set voltage level and frequency range of the regulated and conditioned AC power even in response to the AC power supplied from the main AC power source features swings in at least one of voltage level and frequency outside the set voltage level and frequency range of the regulated and conditioned AC power, wherein the power conversion and conditioning module is configured to supply the uninterruptible supply of regulated and conditioned AC power to remain within the set voltage level and frequency range to electrical equipment loads downstream of the integrated electrical power unit, wherein the power conversion and conditioning module is electrically coupled to a magnetic coupling choke to form a line reactor that provides a prescribed amount of impedance to allow the controller time to change of a state of a set of circuit breakers to isolate the main AC power from the electrical equipment loads so as to operate as an emergency backup source to compensate for and eliminate at least one or more of i) surges, ii) transients, and iii) harmonics issues to a voltage level, frequency, and phase of an AC voltage associated with the AC power coming from the main AC power source from reaching and affecting the electrical equipment loads, wherein the power conversion and conditioning module is further configured to supply a portion of the regulated and conditioned AC power supplied to the electrical equipment loads in order to stay within the set voltage level and frequency range from the power conversion and conditioning module by compensating for any deficiencies from the AC power coming from and still being supplied by the main AC power source to maintain a combined AC power supplied to the electrical equipment loads to remain within the set voltage level and frequency range of the regulated and conditioned AC power.

2. The apparatus of claim 1, wherein the controller of the integrated electrical power unit is electrically coupled to the set of circuit breakers in an electrical distribution system to control an electrically open state or closed state of the set of circuit breakers to put both an electrical distribution system and the integrated electrical power unit into multiple different operational modes.

3. The apparatus of claim 2, wherein electrical power lines of a utility power grid are configured to be the main AC power source, wherein the controller is configured to place the integrated electrical power unit and the set of circuit breakers into a first operational mode to electrically connect the an output of the power conversion and conditioning module to the electrical power lines of the utility power grid to provide frequency regulation, voltage stabilization, and power factor correction on the utility grid in order to support both 1) AC power on the utility grid power itself as well as 2) the electrical equipment loads downstream of the integrated electrical power unit; and thus, the battery storage plant and the power conversion and conditioning module of the integrated electrical power unit are configured to supply the regulated and conditioned AC power to stabilize AC power on the utility power grid while the electrical equipment loads in the facility continue to be serviced with the AC power at the set regulated and conditioned AC voltage level and frequency range from the power conversion and conditioning module.

4. The apparatus of claim 2, wherein the main AC power source is configured to provide a first portion of AC power supplied to the electrical equipment loads that receive power from the integrated electrical power unit, wherein the controller and the power conversion and conditioning module are configured to cooperate to control a phase shift of the AC power from the power conversion and conditioning module during both 1) a normal operational mode and 2) a recovery operational mode when the controller has previously changed a state of a circuit breaker to isolate the AC power from both the integrated electrical power unit and the downstream electrical equipment loads, and as a result, the controller needs to change a state of the circuit breaker to reconnect with the main AC power source supplying the AC power to both the integrated electrical power unit and the downstream electrical equipment loads.

5. The apparatus of claim 2, wherein i) the magnetic coupling choke, ii) at least one or more of the circuit breakers of the set of circuit breakers electrically coupled to the controller, and iii) electrical power lines supplying AC power coming from a connection to the main AC power source to the integrated electrical power unit, at their time of installation into an electrical distribution system, are constructed and sized at an electrical amperage rating to handle at least (a) 125% of a maximum anticipated electrical load when all of the electrical equipment loads are housed in the facility connecting to the integrated electrical power unit and (b) an electrical current demand of charging the battery storage plant of the integrated electrical power unit.

6. The apparatus of claim 1, wherein an instance of the integrated electrical power unit is constructed to be scalable in an amount of capacity over time of its operation by having one or more electrical connections to add on an additional electrical power capacity by adding at least one of 1) another set of back-up batteries and a second power conversion and conditioning module electrically in parallel to an existing set of back-up batteries and the power conversion and conditioning module of the integrated electrical power unit, where the new and existing electrical components all connect to the magnetic coupling choke, which is already installed and 2) an expansion connection to add a number of blocks of back-up batteries to existing back-up batteries in the battery storage plant for that integrated electrical power unit.

7. The apparatus of claim 1, wherein the controller of the integrated electrical power unit is configured to have an electrical tap and sensor to sense characteristics of the AC power coming from the main AC power source, wherein the electrical tap and the sensor connect at a distance upstream of the magnetic coupling choke to combine with the magnetic coupling choke being constructed to have an amount of impedance in order to delay a drop off in voltage level when the AC power from the main AC power source is either unreliable or removed so that then the controller can both change an operational mode of the integrated electrical power unit and its associated circuit breakers without a disruption to the downstream electrical equipment loads, wherein one or more instances of the integrated electrical power units are electrically coupled to 1) be a sole source of continuous emergency backup source of AC power to supply all of the electrical equipment loads connected downstream to the integrated electrical power unit within the regulated and conditioned set AC level and frequency range to the critical electrical equipment loads in the facility as well as 2) change an open status or closed status of one or more circuit breakers in order to electrically isolate the electrical equipment loads from the main AC power source.

8. The apparatus of claim 1, wherein the magnetic coupling choke is constructed to be either (1) a multiple-winding, center-tapped, magnetic coupling choke that is configured to connect the AC power output of the power conversion and conditioning module or (2) a single winding reactor, and the integrated electrical power unit is connected electrically in parallel to the magnetic coupling choke.

9. The apparatus of claim 1, wherein the controller is configured to provide control signals to the power conversion and conditioning module to reduce a supply of the regulated and conditioned AC power to participate in an utility reduced demand program.

10. The apparatus of claim 1, wherein multiple discreet integrated electrical power units are configured to connect to both the main source of AC power and to the electrical equipment loads in the downstream facility to form one or more multiple redundant electrical power distribution schemes.

11. A method comprising:
configuring an integrated electrical power unit to include a battery storage plant, a controller, and a power conversion and conditioning module, wherein the power conversion and conditioning module includes i) electrical components configured to perform an electrical power conversion of alternating current (AC) power supplied from a main AC power source to direct current (DC) power provided to the battery storage plant, ii) electrical components configured to perform an electrical power conversion of DC power from the battery storage plant into AC power supplied out of the power conversion and conditioning module, and iii) electrical components configured to perform an electrical power conditioning of the AC power supplied from the power conversion and conditioning module to be an uninterruptible supply of regulated and conditioned AC power remaining within a set voltage level and frequency range to eliminate swings in voltage amplitude or frequency that are outside the set voltage level and frequency range of the regulated and conditioned AC power even in response to the AC power supplied from the main AC power source into the integrated electrical power unit does have swings in at least one of (i) voltage or (ii) frequency outside the set voltage level and frequency range of the regulated and conditioned AC power;
configuring the power conversion and conditioning module to supply the uninterruptible supply of regulated and conditioned AC power to remain within the set voltage level and frequency range to electrical equipment loads downstream of the integrated electrical power unit; and
configuring the power conversion and conditioning module to electrically couple to a magnetic coupling choke to form a line reactor that provides a prescribed amount of impedance to allow the controller time to change of a state of a set of circuit breakers to isolate the main AC power from the electrical equipment loads so as to operate as an emergency backup source to compensate for and eliminate at least one or more of i) surges, ii) transients, and iii) harmonics issues to a voltage level, frequency, and phase of an AC voltage associated with the AC power coming from the main AC power source from reaching and affecting the electrical equipment loads,
configuring the main AC power source to supply a first portion of the AC power to the electrical equipment loads; and
configuring the power conversion and conditioning module to supply a second portion of the AC power as the regulated and conditioned AC power to the electrical equipment loads in order to stay within the set voltage level and frequency range by compensating for any deficiencies from the AC power coming from the main AC power source to maintain a combined AC power formed by the first portion and the second portion of the AC power supplied to the electrical equipment loads to remain within the set voltage level and frequency range of the regulated and conditioned AC power.

12. The method of claim 11, further comprising:
configuring the controller of the integrated electrical power unit to be electrically coupled to the set of circuit breakers in an electrical distribution system to control an electrically open state or closed state of the set of circuit breakers to put both an electrical distribution system and the integrated electrical power unit into multiple different operational modes.

13. The method of claim 12, further comprising:
configuring electrical power lines of a utility power grid to be the main AC power source; and
configuring the controller to place the integrated electrical power unit and the set of circuit breakers into a first operational mode to electrically connect the an output of the power conversion and conditioning module to the electrical power lines of the utility power grid to provide frequency regulation, voltage stabilization, and power factor correction on the utility grid in order to support both 1) AC power on the utility grid power itself as well as 2) the electrical equipment loads downstream of the integrated electrical power unit; and thus, the battery storage plant and the power conversion and conditioning module of the integrated electrical power unit are configured to supply the regulated and conditioned AC power to stabilize AC power on the utility power grid while the electrical equipment loads in the facility continue to be serviced with the AC power at the set regulated and conditioned AC voltage level and frequency range from the power conversion and conditioning module.

14. The method of claim 12, further comprising:
wherein the controller and the power conversion and conditioning module is configured to cooperate to control a phase shift of the AC power from the power conversion and conditioning module during both 1) a normal operational mode and 2) a recovery operational mode when the controller has previously changed a state of a circuit breaker to isolate the AC power from both the integrated electrical power unit and the electrical equipment loads, and as a result, the controller needs to change a state of the circuit breaker to reconnect with the main AC power source supplying the AC power to both the integrated electrical power unit and the electrical equipment loads.

15. The method of claim 12, further comprising:
configuring i) the magnetic coupling choke, ii) at least one or more of the circuit breakers of the set of circuit breakers electrically coupled to the controller, and iii) electrical power lines supplying AC power coming from a connection to the main AC power source to the integrated electrical power unit, at their time of installation into an electrical distribution system, are constructed and sized at an electrical amperage rating to handle at least (a) 125% of the maximum anticipated electrical load when the electrical equipment loads are housed in the facility connecting to the integrated electrical power unit and (b) an electrical current demand of charging the battery storage plant of the integrated electrical power unit.

16. The method of claim 11, further comprising:
configuring an instance of the integrated electrical power unit to be scalable in an amount of capacity over time of its operation by having one or more electrical connections to add on an additional electrical power capacity by adding at least one of 1) another set of back-up batteries and a second power conversion and conditioning module electrically in parallel to an existing set of back-up batteries and the power conversion and conditioning module of the integrated electrical power unit, where the new and existing electrical components all connect to the magnetic coupling choke, which is already installed and 2) an expansion connection to add a number of blocks of back-up batteries to existing back-up batteries in the battery storage plant for that integrated electrical power unit.

17. The method of claim 11, further comprising:
configuring the controller of the integrated electrical power unit to have an electrical tap and sensor to sense characteristics of the AC power coming from the main AC power source,
wherein the electrical tap and the sensor connect at a distance upstream of the magnetic coupling choke to combine with the magnetic coupling choke being constructed to have an amount of impedance in order to delay a drop off in voltage level when the AC power from the main AC power source is either unreliable or removed so that then the controller can both change an operational mode of the integrated electrical power unit and its associated circuit breakers without a disruption to the downstream electrical equipment loads,
wherein one or more instances of the integrated electrical power units are electrically coupled to 1) be a sole source of continuous emergency backup source of AC power to supply all of the electrical equipment loads connected downstream to the integrated electrical power unit within the regulated and conditioned set AC level and frequency range to the critical electrical equipment loads in the facility as well as 2) change an open status or closed status of one or more circuit breakers in order to electrically isolate the electrical equipment loads from the main AC power source.

18. The method of claim 11, further comprising:
configuring the magnetic coupling choke to be a multiple-winding, center-tapped coupling choke that is configured to connect the AC power output of the power conversion and conditioning module.

19. The method of claim 11, further comprising:
configuring the magnetic coupling choke to be a single winding reactor, and the integrated electrical power unit is connected electrically in parallel to the magnetic coupling choke.

20. The method of claim 11, further comprising:
configuring multiple discreet integrated electrical power units to connect to both the main source of AC power and to the electrical equipment loads in the downstream facility to form one or more multiple redundant electrical power distribution schemes.

21. The apparatus of claim 1, wherein the battery storage plant of the integrated electrical power unit is configured to have a capacity in amp hours (Ahrs) to operate as the emergency backup source for AC power to supply the electrical equipment loads connected downstream to the integrated electrical power unit for greater than an hour.

22. The apparatus of claim 1, wherein the integrated electrical power unit is electrically located between the main source of AC power and an input circuit breaker of a distribution switchboard of a facility containing the electrical equipment loads.

23. The apparatus of claim 1, wherein the integrated electrical power unit coupled to the magnetic coupling choke is further configured to act as both the line reactor to supply the uninterruptible regulated and conditioned source of AC power and an emergency backup source of AC power.

* * * * *